United States Patent
Brock et al.

(10) Patent No.: US 6,677,419 B1
(45) Date of Patent: Jan. 13, 2004

(54) PREPARATION OF COPOLYMERS

(75) Inventors: Phillip J. Brock, Sunnyvale, CA (US); Eiichi Kobayashi, Yokkaichi (JP); Isao Nishimura, Yokkaichi (JP); Yukio Nishimura, Yokkaichi (JP); Thomas I. Wallow, Fremont, CA (US); Masafumi Yamamoto, Yokkaichi (JP)

(73) Assignees: International Business Machines Corporation, Armonk, NY (US); JSR Corporation, Tokyo (JP)

(*) Notice: Subject to any disclaimer, the term of this patent is extended or adjusted under 35 U.S.C. 154(b) by 0 days.

(21) Appl. No.: 10/293,740

(22) Filed: Nov. 13, 2002

(51) Int. Cl.[7] .............................................. C08F 10/00
(52) U.S. Cl. ...................... 526/281; 526/280; 526/284; 526/303.1; 526/317.1; 526/319; 526/342
(58) Field of Search ............................. 526/280, 281, 526/284, 297, 303.1, 317.1, 342, 319; 430/271.1

(56) References Cited

U.S. PATENT DOCUMENTS

| | | |
|---|---|---|
| 2,985,611 A | 5/1961 | Gaylord et al. |
| 3,536,681 A | 10/1970 | Morris |
| 3,697,490 A | 10/1972 | Starmer |
| 3,723,399 A | 3/1973 | Amiard et al. |
| 5,585,219 A | 12/1996 | Kaimoto et al. |
| 5,585,222 A | 12/1996 | Kaimoto et al. |
| 6,111,041 A | 8/2000 | Sen et al. |
| 6,136,499 A | 10/2000 | Goodall et al. |
| 6,177,228 B1 | 1/2001 | Allen et al. |
| 6,232,417 B1 | 5/2001 | Rhodes et al. |
| 6,235,849 B1 | 5/2001 | Jayaraman et al. |
| 6,251,560 B1 | 6/2001 | Wallow et al. |
| 6,300,440 B1 | 10/2001 | Sen et al. |
| 6,303,265 B1 | 10/2001 | Sato |
| 6,303,724 B1 | 10/2001 | Goodall et al. |
| 6,322,948 B1 * | 11/2001 | Jung et al. ................ 430/270.1 |
| 6,472,120 B1 * | 10/2002 | Jung et al. ................ 430/270.1 |
| 6,475,699 B2 * | 11/2002 | Uetani et al. ............. 430/270.1 |
| 2002/0004570 A1 | 1/2002 | Zampini et al. |
| 2002/0040115 A1 | 4/2002 | Sen et al. |
| 2002/0177069 A1 * | 11/2002 | Jung et al. ................ 430/270.1 |

FOREIGN PATENT DOCUMENTS

| | | |
|---|---|---|
| EP | 0 162 570 A1 * | 11/1985 |
| EP | 1 078 945 A2 * | 2/2001 |
| GB | 2 356 258 A * | 5/2001 |
| JP | 7234511 | 9/1995 |
| JP | 2001242627 | 9/2001 |
| JP | 2002023371 | 1/2002 |

OTHER PUBLICATIONS

Rushkin et al. Proceedings of SPIE–The Internationl Society for optical Engineering (1999), 3678 (Part 1), 44–50.*

(List continued on next page.)

Primary Examiner—Helen L. Pezzuto
(74) Attorney, Agent, or Firm—Scully, Scott Murphy & Presser; Daniel E. Johnson

(57) ABSTRACT

A scaleable and high-yielding method of preparing copolymers that is useful as a component of a radiation sensitive resin composition is provided. The method includes the step of reacting at least one monomer A which is an unsaturated alicyclic monomer and forms a polymer main chain by dissociation of the unsaturated bond, and at least one unsaturated monomer B, which also forms a polymer chain by dissociation of an unsaturated bond, wherein less than two electron-withdrawing groups are directly appended to said unsaturation, and where said monomer B is other than the unsaturated alicyclic monomer and forms a polymer main chain, in the presence of a free radical initiator. The reacting step is carried out in a stoichiometric excess of monomer A as compared to monomer B. By carrying out the reacting step in an excess of monomer A as compared to monomer B, the resultant copolymer will have a greater molar concentration of monomer A than is obtainable using other methods.

21 Claims, 1 Drawing Sheet

OTHER PUBLICATIONS

Frédéric Fotiadu, et al., "High Exoselectivity in Diels–Alder Additions of α–Vinylidene and α–Methylene–γ–Butyrolactones to Cyclopentadiene", *Tetrahedron Letters*, vol. 31, No. 34, pp. 4863–4866, (1990).

Jany Haslouin, et al., "Preparation D'α, DE β et DE γ–Methylene γ–Butyrolactones Par Reaction Retrodienique Thermique", *Tetrahedron Letters*, No. 50. pp. 4651–4654, (1976).

Margaret M. Kayser, et al., "Reduction of cyclic anhydrides. II. Factors affecting regioselectivity of attack on the carbonyl group by metal hydrides", *Can. J. Chem.*, vol. 56, pp. 1524–1532, (1978).

Koji Nozaki, et al., "New Protective Groups in Alicyclic Methacrylate Polymers for 193–nm Resists", *Journal of Photopolymer Science and Technology*, vol. 10, No. 4, pp. 545–550, (1997).

Gonglu Tian, et al., "Neutral Palladium Complexes as Catalysts for Olefin–Methyl Acrylate Copolymerization: A Cautionary Tale", *Macromolecules*, No. 34, pp. 7656–7663, (2001).

\* cited by examiner

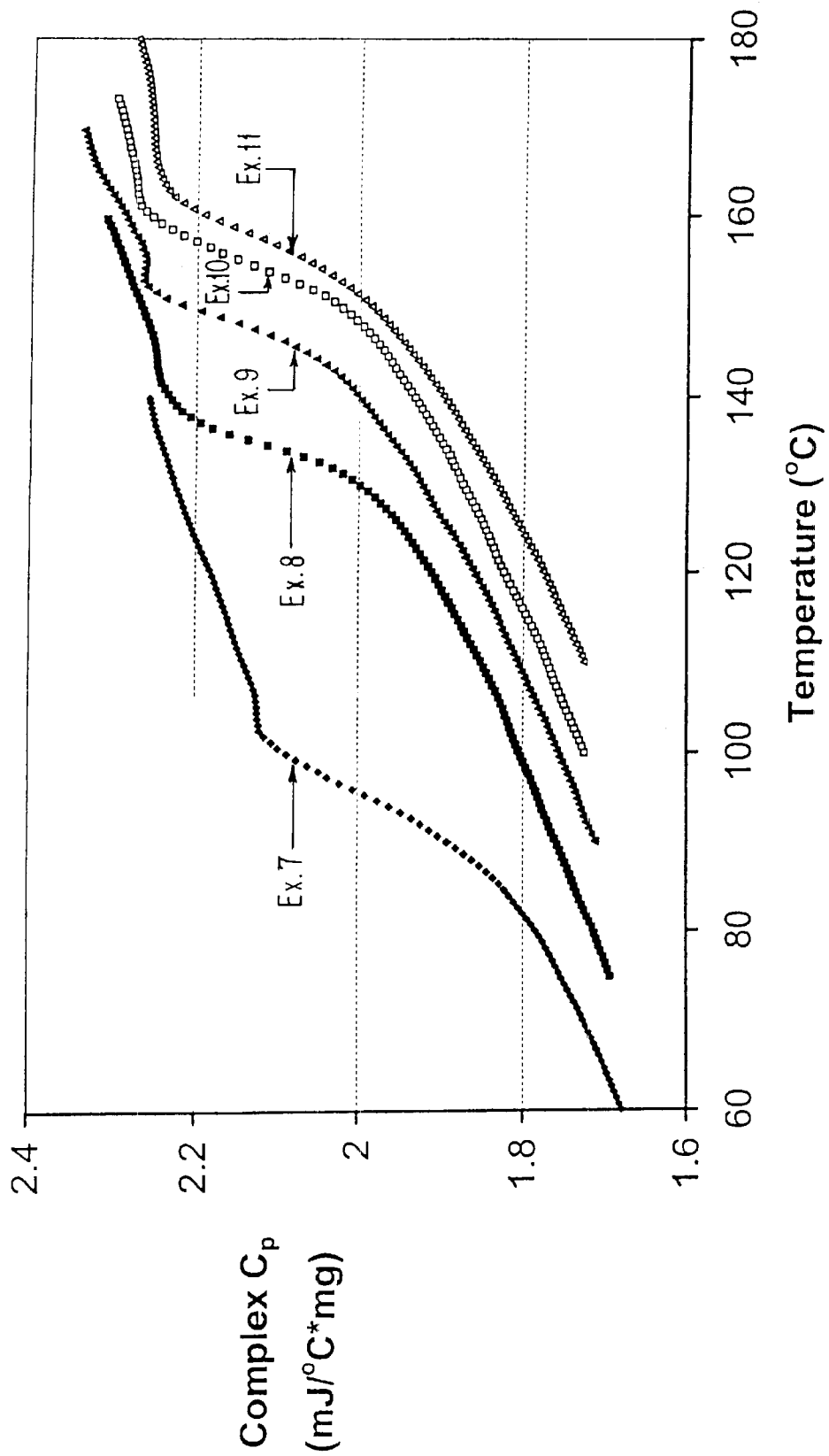

PREPARATION OF COPOLYMERS

DESCRIPTION

1. Field of the Invention

The present invention relates to a scaleable and high-yielding method for producing a copolymer, which can be used as a component of a radiation-sensitive resin composition. More particularly, the present invention relates to a method for producing a copolymer that is suitable for a chemically-amplified resist which is useful for microfabrication utilizing various types of radiation such as, deep ultraviolet rays from a KrF excimer laser or ArF excimer laser, charged particle rays such as electron beams; and X-rays such as synchrotron radiation.

BACKGROUND OF THE INVENTION

In the field of microfabrication represented by fabrication of integrated circuit (IC) devices, lithographic technology enabling microfabrication with a line width of 0.20 $\mu$m or less has been demanded in order to increase the degree of integration. However, microfabrication with a line width of sub-quarter micron is very difficult using near ultraviolet (UV) rays, such as i-line radiation, which are used in a conventional lithographic process.

To deal with this problem, the use of a shorter wavelength radiation has been studied in order to enable microfabrication with a line width of 0.20 $\mu$m or less. Examples of such shorter wavelength radiation include, but are not limited to: deep ultraviolet rays from a bright-line spectrum of a mercury lamp and an excimer laser; X-rays; electron beams; and the like. In particular, a KrF excimer laser (at 248 nm) and ArF excimer laser (at 193 nm) have attracted attention.

Various types of UV-sensitive compositions that utilize chemical amplification effects arising from an acid-dissociable-group-containing resin have been proposed, in which the resin includes a functional group which increases alkali solubility through the action of an acid and a component which generates an acid upon irradiation (exposure) (hereinafter called 'photoacid generator'). These radiation-sensitive resin compositions have been used as chemically-amplified resists.

For example, Japanese Patent Application Laid-open No. 7-234511 proposes a method of introducing an aliphatic ring into a resin component of the resist to produce a chemically-amplified resist having good radiation transmissivity (in comparison with a conventional phenol-based resin) and improved dry etching resistance.

A chemically-amplified positive-tone resist composition having high transparency at 193 nm, exhibiting high resolution, and being capable of forming a resist pattern of good pattern shape, dry etching resistance, and adhesion to substrates is proposed in Japanese Patent Application Laid-open No. 2001-242627. Specifically, a chemically-amplified resist using a resin having a unit derived from an acrylate or methacrylate is taught, of which the ester portion has a crosslinked saturated polycyclic hydrocarbon group containing a lactone ring in the main chain.

As an acid-dissociable-group-containing resin, Japanese Patent Application Laid-open No. 2002-23371 proposes a resin in which the unsaturated bond of an unsaturated alicyclic compound dissociates to make up part of the polymer main chain, for example.

As described above, acid-dissociable-group-containing resins may be obtained by copolymerizing various types of monomers. However, even if monomers of differing molecular structure are copolymerized in a specific ratio in order to obtain a desired molecule of a resin suitable for use with short wavelength radiation (for example, deep ultraviolet rays), the resulting resin may have a monomer content differing from the expected value. In particular, the content of a monomer which forms a polymer main chain by dissociation of the unsaturated bond of an unsaturated alicyclic compound may be decreased in the resulting copolymer. This makes molecular design of a resin having high transparency to radiation and excelling in basic properties as a resist difficult.

In the case of copolymerizing cyclic olefin monomers and acrylic monomers under free radical conditions, the copolymerization is typically carried out using excess acrylic monomer as compared to cyclic olefin monomer. See, for example, U.S. Pat. Nos. 2,985,611; 3,536,681; and 3,697,490. In such copolymerizations, a low amount of cyclic olefin copolymer is incorporated into the matrix of the final copolymer or resin. It is noted that the terms "copolymer" and "resin" are used interchangeably throughout this application.

In other copolymerizations of cyclic olefin monomers and acrylic monomers, a transition metal catalyst, i.e., co-ordination catalyst, or Lewis acid promoter is typically required to carry out the copolymerization. Such copolymerizations are described, for example, in U.S. Pat. Nos. 3,723,399; 6,111,041; 6,136,499; 6,232,417; 6,235,849; 6,300,440; and 6,303,724 as well as U.S. Patent Application Publication US2002/0040115A1 and the article to Tian, et al., entitled "Neutral Palladium Complexes as Catalysts for Olefin-Methyl Acrylate Copolymerization; A Cautionary Tale", Macromolecules 2001, 34, 7656–7663. A noted problem with using resins madefrom such metal catalysts is that the metal component frequently contaminates the final resin. Thus, a metal removal step must be used if the resins are to be used in the microfabrication of IC devices.

U.S. Pat. Nos. 5,585,219 and 5,585,222 disclose that electron-withdrawing substituents on the cyclic olefin monomer can facilitate an anionic copolymerization of the cyclic olefin monomer with acrylate or methacrylate.

U.S. Pat. No. 6,303,265 discloses that cyclic olefin copolymers may be made with monomers that possess two electron-withdrawing groups appended to the polymerizable double bond such as maleic acid and its esters. Specifically, in the '265 patent, the copolymerization of the cyclic olefin is carried out in the presence of an electron poor monomer which contains two electron-withdrawing groups. The use of monomers containing two electron-withdrawing groups in conjunction with a cyclic olefin falls within the well-known regime of an alternating copolymerization. Previosuly disclosed copolymerizations of cyclic olefins with monomers containing one electron-withdrawing group are very limited and are discussed herein below.

U.S. Patent Application Publication US2002/0004570A1 discloses palladium, nickel, and free radical techniques for making cyclic olefin homopolymers having one or more pendant cyclic electron-withdrawing groups. In this reference, a complex cyclic olefin which includes a cyclic electron-withdrawing group that depends from a cyclic olefin is disclosed. No free-radical methods for preparing cyclic olefin-acrylate copolymers are disclosed in this application.

Although various methods of preparing resins including a cyclic olefin monomer are known, there is still a need for providing a new and improved method for producing a copolymer wherein the cyclic olefin monomer is copolymerized with another monomer that contains less than two electron-withdrawing groups attached thereto. Moreover, a method is needed wherein the amount of cyclic olefin being incorporated into the final resin is greater than heretofore possible with prior art free radical polymerization processes.

SUMMARY OF THE INVENTION

The present invention provides a simple, scaleable, high-yielding method to prepare copolymers of an unsaturated alicyclic monomer and an electron poor monomer which comprises reacting at least one monomer A which is an unsaturated alicyclic monomer and forms a polymer main chain by dissociation of an unsaturated bond, and at least one unsaturated monomer B, which also forms a polymer chain by dissociation of an unsaturated bond, wherein less than two electron-withdrawing groups are directly appended to said unsaturation, and where said monomer B is other than the unsaturated alicyclic monomer and forms a polymer main chain, in the presence of a free radical initiator, wherein said reacting is carried out using a stoichiometric excess of monomer A as compared to monomer B. By carrying out the reacting step in an excess of monomer A as compared to monomer B, the resultant copolymer will have a greater molar concentration of monomer A than is obtainable using prior art methods. One advantage of the present invention, among others, is that the inventive method allows for producing resins that have a glass transition temperature ($T_g$) of from about 120° C. to about 180° C.

It has been found that the reaction rate between monomers A is considerably slower than the reaction rate between monomer A and monomer B, which in turn is considerably slower than the reaction rate between monomers B. Similarly, the reaction rate between monomer B and monomer A is considerably slower than the reaction rate between monomers B. For example, although monomers A scarcely form a polymer, monomer A forms a copolymer in the presence of monomer B.

In a preferred aspect of the present invention, a copolymer of A and B can be obtained by copolymerizing the monomers under conditions in which the reaction mixture contains at least twice as much monomer A as compared to monomer B on a molar basis. In one embodiment, and in terms of a molar fraction, the resultant copolymer contains from about 15 to about 35% monomer A and from about 65 to about 85% monomer B. More preferably, the resultant copolymer contains, in terms of molar fraction, from about 25 to about 35% monomer A and from about 65 to about 75% monomer B.

In accordance with the present invention, monomer A, and monomer B may be added continuously, intermittently, or in stepwise fashion to a reaction vessel. In one embodiment of the present invention, additional monomer B may be added to the reaction after the copolymer has begun to form. In that particular embodiment of the present invention, the adding step may be performed such that monomer B is continuously being added to monomer A.

It should be noted that in the method of the present invention, the reaction occurs in the absence of any significant concentration of a Lewis acid promoter, such as a metal-chloride compound, or co-ordination catalyst. Because no significant amount of a Lewis acid promoter or co-ordination catalyst is present during the free radical copolymerization reaction, the resultant copolymer formed in the present invention does not need to undergo a metal removal process prior to being used as a component in a radiation-sensitive resist composition.

The inventive method thus allows for feasible, high-yielding syntheses of a resin in the absence of a Lewis acid promoter or co-ordination catalyst. Moreover, the inventive method greatly simplifies the synthetic procedure and isolation of a desired copolymer.

BRIEF DESCRIPTION OF THE DRAWINGS

The sole FIGURE of the present application is a graph of Complex $C_p$ (mJ/° C.*mg) vs. temperature (° C.) for Examples 7–11.

DETAILED DESCRIPTION OF THE INVENTION

Monomer A and monomer B according to the present invention are described below. Specifically, monomer A is an unsaturated alicyclic monomer which forms a polymer main chain by dissociation of the unsaturated bond. Monomer B, on the other hand, is a momoner having an unsaturated bond other than the above-mentioned unsaturated alicyclic monomer which forms the polymer main chain by dissociation of the unsaturated bond. Another characteristic feature of monomer B is that the monomer contains less than two electron-withdrawing groups, i.e., monomer B is an electron poor monomer.

Specifically, monomer A of the present invention is preferably a cyclic olefin monomer comprising at least one of the following formulas:

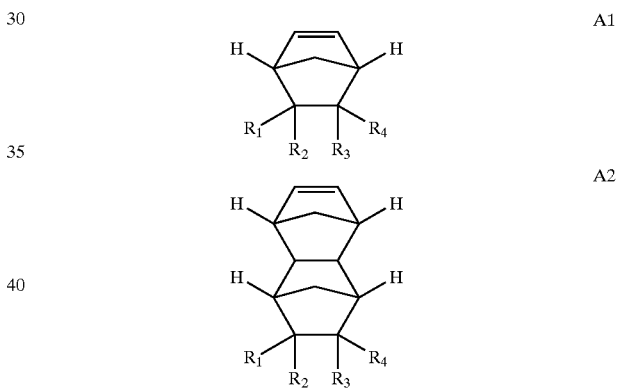

wherein $R_1$, $R_2$, $R_3$ and $R_4$, independently of each other, may be selected from the group consisting of hydrogen, hydrocarbons, halogens (preferably fluorine), halogenated carbons or hydrocarbons, and functionalized hydrocarbons of the form R* or J-R* where J is a divalent spacer group and R* is a polar group having one or more heteroatoms with a Pauling electronegativity greater than 3.0, or $R_1$ and $R_2$, $R_3$ and $R_4$, $R_1$ and $R_4$, or $R_2$ and $R_3$, taken together, can be a five- or six-membered cyclic hydrocarbon ring that optionally contains an R* group within the ring or pendant thereto. In one embodiment of the present invention, it is preferred that each $R_1$, $R_2$, $R_3$, and $R_4$ be hydrogen. In another embodiment of the present invention (to be discussed in greater detail below), it is preferred that at least three of $R_1$, $R_2$, $R_3$, and $R_4$ be hydrogen, and the remaining R be other than hydrogen.

The term 'hydrocarbon' is used hereto to denote a linear or branched, substituted or unsubstituted aliphatic compound (including alkanes, alkenes, alkynes, cycloalkanes, cycloalkenes or any derivatives thereof) which includes from about 1 to about 24, preferably from about 2 to 18, more preferably, from about 2 to 12 carbon atoms. When substituted aliphatic compounds are employed, the substitute group may be another hydrocarbon, an alkoxy, a hydroxy, a halogen, a carboxy, a carbonyl, an oxy, or any combination thereof.

As stated above, J represents a divalent spacer group which includes divalent hydrocarbon radicals (e.g., alkylene radicals, $C_{1-6}$, preferably $C_2$, optionally branched where preferably the carbon bonded to the oxygen is —$CH_2$—) or divalent cyclic hydrocarbon radicals (e.g., $C_{3-8}$). Suitable R* include the following: mono-, di-, tri-, tetra-alkoxy, e.g., lower $C_{1-6}$ alkoxy; alkyl carbonyl; (mono-, di-, tri-, tetra alkoxy) carbonyl; (mono-, di-, tri-, tetra-alkoxy) alkyl carbonyl; alkyl carbonyloxy; (mono-, di-, tri-, tetra-alkoxy) carbonyloxy; alkyl dicarbonyloxy; (mono-, di-, tri-, tetra-alkoxy) alkyl-dicarbonyloxy; (mono-, di-, tri-, tetra-alkoxyalkyl) dicarbonyloxy; amino; alkyl amino; (mono-, di-, tri-, tetra-alkoxy) alkylamino; alkyl carbonyl amino and alkyl sulfonyl amino where each alkyl is preferably lower $C_{1-6}$ alkyl.

Other suitable polar substituents include: lactams, lactones, cyclic glycerin and camphor such as are described in U.S. Pat. No. 6,177,228 (See, Col. 3, lines 15–65). The entire content of the '228 patent is incorporated herein by reference.

Other olefins that can be used in the present invention as monomer A include those described in U.S. Pat. No. 6,251,560, especially at Cols. 3–6; U.S. Pat. No. 6,136,499, particularly at Cols. 5–12; and US Published Patent Application US2002/0004570A1, particularly at paragraphs [52]–[57]. The entire contents of each of the aforementioned references are also incorporated herein by reference.

The non-alicyclic, electron poor monomer (containing less than two electron-withdrawing groups) which can be employed as monomer B preferably has at least one of the following formulas (B1–B4):

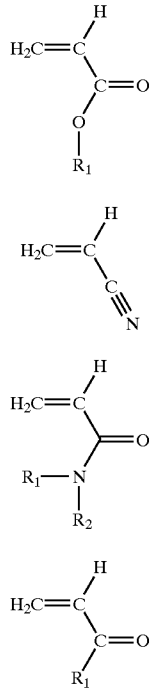

wherein $R_1$ and $R_2$ have the same meaning as indicated above for monomers A1 and A2. Of the above non-alicyclic monomers, the present invention prefers to use monomers B1 and B2.

In a preferred embodiment of the present invention, monomer A and monomer B may be respectively shown by formulas (1) and (2).

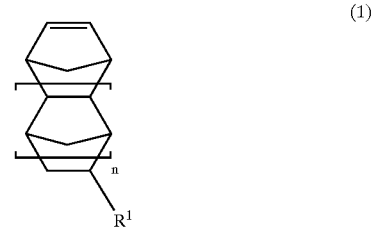

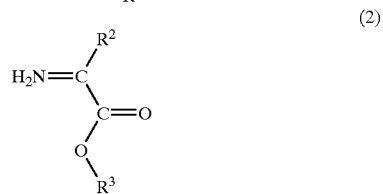

wherein $R^1$ represents a monovalent organic group, $R^2$ represents a hydrogen atom, and $R^3$ represents a monovalent organic group, and n is an integer from 1 to 2.

The monovalent organic group represented by $R^1$ in formula (1) is a functional group shown by the following formulae (1-1), (1-2), (1-3), or (1-4).

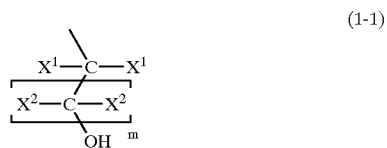

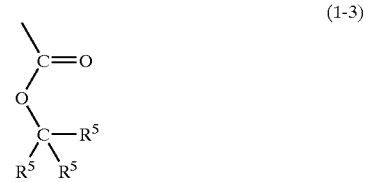

In formula (1-1), $X^1$ and $X^2$ individually represent a hydrogen atom, a fluorine atom, an alkyl group, or a fluoroalkyl group, and m is an integer from 0 to 5.

In formula (1-2), $R^4$ represents a single bond or a divalent group having a linear, branched, or alicyclic skeleton, and X represents a hydrogen atom or a monovalent functional group such as a hydroxyl group, carboxyl group, nitro group, cyano group, or amino group.

In formula (1-3), $R^5$ individually represents a monovalent alicyclic hydrocarbon group having 4–20 carbon atoms, a derivative thereof, or a linear or branched alkyl group having 1–4 carbon atoms, provided that at least one $R^5$ is the monovalent alicyclic hydrocarbon group or the derivative thereof, or two $R^5$ groups bond to form a divalent alicyclic hydrocarbon group having 4–20 carbon atoms or a derivative thereof together with the carbon atom to which the two $R^5$ groups bond, with the remaining $R^5$ being a linear or branched alkyl group having 1–4 carbon atoms or a monovalent alicyclic hydrocarbon group having 4–20 carbon atoms or a derivative thereof.

In formula (1-4), $R^6$ represents an alkyl group having a linear, branched, or alicyclic skeleton or a lactone skeleton which may have a substituent shown by the following formula (1-4-1), (1-4-2), or (1-4-3).

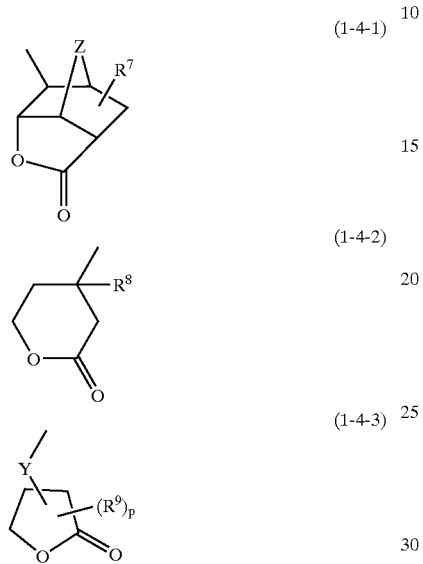

(1-4-1)

(1-4-2)

(1-4-3)

In formulas (1-4-1) and (1-4-2), $R^7$ and $R^8$ individually represent a hydrogen atom or a linear or branched alkyl group or alkoxy group having 1–5 carbon atoms. In formula (1-4-3), $R^9$ represents a hydrogen atom or a linear or branched alkyl group or alkoxy group having 1–5 carbon atoms. Z represents no bond, a methyl group, dimethylmethyl group, an oxygen atom, or sulfur atom, Y represents a single bond or a methylene group, and p is an integer from 0 to 4.

The monovalent organic group for $R^3$ in formula (2) is a functional group shown by the following formula (2-1), (2-2), or (2-3).

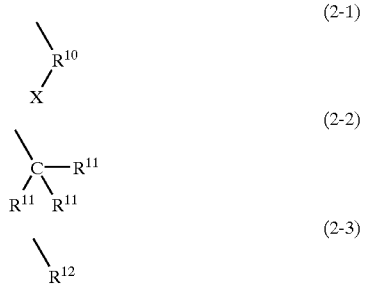

(2-1)

(2-2)

(2-3)

$R^{10}$ in formula (2-1), $R^{11}$ in formula (2-2), and $R^{12}$ in formula (2-3) represent the same functional groups represented by $R^4$ in formula (1-2), $R^5$ in formula (1-3), and $R^6$ in formula (1-4), respectively. In the following description, only one of each group is mentioned. Specific examples of the functional groups shown in each formula are given below.

The following formulas show the position number of carbon atoms in the polyalicyclic skeletons used below.

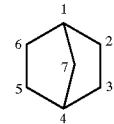

(A)

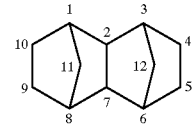

(B)

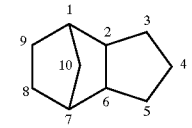

(C)

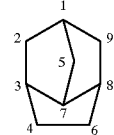

(D)

Formula (A) shows bicyclo[2.2.1]heptane, formula (B) shows tetracyclo[6.2.1.1$^{3,6}$.0$^{2,7}$]dodecane, formula (C) shows tricyclo[5.2.1.0$^{2,6}$]decane, and formula (D) shows tricyclo[4.2.1.0$^{3,7}$]nonane. In the following description, notations of alicyclic skeletons are according to formulas (A) to (D).

Illustrative examples of the hydroxyalkyl group represented by $R^2$ in formula (2) include, but are not limited to: a hydroxymethyl group, 2-hydroxyethyl group, and the like. Examples of the perfluoroalkyl group represented by $R_2$ include: a monofluoromethyl group, difluoromethyl group, trifluoromethyl group, and the like.

Illustrative examples of the alkyl group represented by $X^1$ and $X^2$ in formula (1-1) include: a methyl group, ethyl group, n-propyl group, i-propyl group, n-butyl group, 2-methylpropyl group, 1-methylpropyl group, t-butyl group, and the like. Examples of the fluoroalkyl group include: a monofluoromethyl group, difluoromethyl group, trifluoromethyl group, 1-fluoroethyl group, 1,2-difluoroethyl group, 1,1,2,2-tetrafluoroethyl group, and the like.

As $X^1$ and $X^2$, a hydrogen atom, fluorine atom, a trifluoromethyl group, and the like are preferable. Therefore, illustrative examples of groups represented by formula (1-1) bonded to the main chain at the 1-position include the following: a hydroxymethyl group, 2-hydroxymethyl group, 3-hydroxypropyl group, 1-fluoro-1-hydroxymethyl group, 1,1-difluoro-1-hydroxymethyl group, 1,2-difluoro-2-hydroxy methyl group; 1,1,2,2-tetrafluoro-2-hydroxymethyl group, 2-trifluoromethyl-2-hydroxyethyl group, 2,2-ditrifluoromethyl-2-hydroxyethyl group, and the like.

Examples of the divalent organic group having a linear, branched, or alicyclic skeleton represented by $R^4$ in formula (1-2) include, but are not limited to: an alkylene group such as, a methylene group, ethylene group, n-propylene group, isopropylene group, n-butylene group, and isobutylene group; a divalent organic group derived from a cycloalkyl such as, cyclopentane, cyclohexane, cycloheptane, and cyclooctane; a divalent organic group derived from adamantane; a divalent organic group derived from bicyclo[2.2.1] heptane; a divalent organic group derived from tetracyclo [6.2.1.1$^{3,6}$.0$^{2,7}$]dodecane; and the like.

As $R^4$ and $R^{10}$, a single bond, a methylene group, ethylene group, divalent organic group derived from adamantane, divalent organic group derived from bicyclo[2.2.1]heptane, and the like are preferable.

As X in formula (1-2), a hydrogen atom, a hydroxyl group, nitrile group, and the like are preferable. Therefore, as formulas (1-2) and (2-1), indicated as a residue bonded to an oxygen atom, a hydrogen atom, a hydroxyl group, hydroxymethyl group, 2-hydroxyethyl group, 3-hydroxypropyl group, 3-hydroxyadamant-1-yl group, 5(6)-hydroxybicyclo[2.2.1]hept-2-yl group, 9(10)-hydroxytetracyclo[6.2.1.1$^{3,6}$.0$^{2,7}$]dodec-4-yl group, carboxyl group, carboxymethyl group, 2-carboxyethyl group, 3-carboxypropyl group, 3-carboxyadamant-1-yl group, 5(6)-carboxybicyclo[2.2.1]hept-2-yl group, 9(10)-carboxytetracyclo[6.2.1.1$^{3,6}$.0$^{2,7}$]dodec-4-yl group, cyano group, cyanomethyl group, 2-cyanoethyl group, 3-cyanopropyl group, 3-cyanoadamant-1-yl group, 5(6)-cyanobicyclo[2.2.1]hept-2-yl group, 9(10)-cyanotetracyclo[6.2.1.1$^{3,6}$.0$^{2,7}$]dodec-4-yl group, and the like are mentioned.

As the monovalent alicyclic hydrocarbon group having 4–20 carbon atoms or a derivative thereof represented by $R^5$ in formula (1-3), and as the divalent alicyclic hydrocarbon group having 4–20 carbon atoms formed by two $R^5$ groups together with the carbon atom to which the two $R^5$ groups bond or a derivative thereof, alicyclic groups derived from cycloalkanes such as bicyclo[2.2.1]heptane, tricyclo[5.2.1.0$^{2,6}$]decane, tetracyclo[6.2,1.1$^{3,6}$.0$^{2,7}$]dodecane, cyclobutane, cyclopentane, cyclohexane, cycloheptane, and cyclooctane; groups in which the alicyclic groups are replaced with at least one linear, branched, or cyclic alkyl group having 1–4 carbon atoms such as a methyl group, ethyl group, n-propyl group, i-propyl group, n-butyl group, 2-methylpropyl group, 1-methylpropyl group, and t-butyl group; and the like may be mentioned.

Examples of the derivatives of the monovalent or divalent alicyclic hydrocarbon groups represented by $R^5$ in formula (1-3) include: groups having one or more substituents such as a hydroxyl group; a carboxyl group; an oxo group (=O); a hydroxyalkyl group having 1–4 carbon atoms such as a hydroxymethyl group, 1-hydroxyethyl group, 2-hydroxyethyl group, 1-hydroxypropyl group, 2-hydroxypropyl group, 3-hydroxypropyl group, 2-hydroxybutyl group, 3-hydroxybutyl group, and 4-hydroxybutyl group; an alkoxyl group having 1–4 carbon atoms such as a methoxy group, ethoxy group, n-propoxy group, i-propoxy group, n-butoxy group, 2-methylpropoxy group, 1-methylpropoxy group, and t-butoxy group; a cyano group; a cyanoalkyl group having 2–5 carbon atoms such as a cyanomethyl group, 2-cyanoethyl group, 3-cyanopropyl group, and 4-cyanobutyl group; and the like.

Of these substituents, a hydroxyl group, carboxyl group, hydroxymethyl group, cyano group, cyanomethyl group, and the like are preferable.

Illustrative examples of the linear or branched alkyl group having 1–4 carbon atoms represented by $R^5$ include: a methyl group, ethyl group, n-propyl group, i-propyl group, n-butyl group, 2-methylpropyl group, 1-methylpropyl group, t-butyl group, and the like. Of these alkyl groups, a methyl group and an ethyl group are preferable.

As preferable examples of the divalent alicyclic hydrocarbon group having 4–20 carbon atoms formed by two $R^5$ groups which bond together with the carbon atom to which the two $R_5$ groups bond or a derivative thereof, groups shown by the following formulas (1-3-1) to (1-3-4) can be given. In each formula, $R^5$ is the same as $R^9$, which is bonded to oxygen in the main chain or side chain of the same carbon bond q and r are integers from 0 to 2.

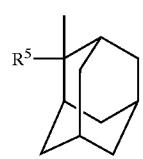

(1-3-1)

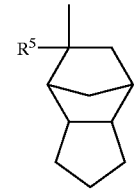

(1-3-2)

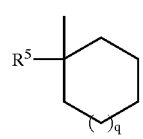

(1-3-3)

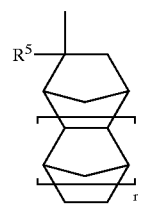

(1-3-4)

As preferable examples of the skeleton when at least one $R^5$ forms the monovalent alicyclic hydrocarbon group having 4–20 carbon atoms, groups shown by the following formulas (1-3-5) to (1-3-8) can be given. Note that $R^5$ in each formula is the same as $R^{11}$, and q and r are integers from 0 to 2.

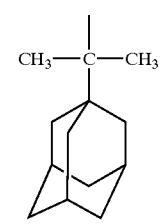

(1-3-5)

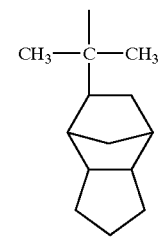

(1-3-6)

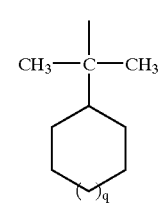

(1-3-7)

(1-3-8)

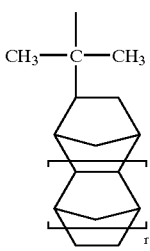

As preferable examples of the monovalent functional group side chain (1–3) or (2-2) formed by $R^5$ or $R^{11}$, the following groups can be given. Note that the following examples are —$C(R^5)_3$ or —$C(R^{11})_3$ bonded to the ester group.

Examples include: a trialkylmethyl group such as a t-butyl group, 2-methyl-2-propyl group, 3-methyl-3-butyl group, 2-methyl-2-butyl group, 2-ethyl-2-butyl group, 3-ethyl-3-butyl group, and 3-methyl-3-pentyl group; an alkylcycloalkyl group such as a 2-methyladamant-2-yl group, 2-methyl-3-hydroxyadamant-2-yl group, 2-methyl-3-cyanoadamant-2-yl group, 2-ethyladamant-2-yl group, 2-ethyl-3-hydroxyadamant-2-yl group, 2-ethyl-3-cyanoadamant-2-yl group, 8-methyltricyclo[5.2.1.0$^{2,6}$]dec-8-yl group, 8-methyl-4-hydroxytricyclo[5.2.1.0$^{2,6}$]dec-8-yl group, 8-methyl-4-cyanotricyclo[5.2.1.0$^{2,6}$]dec-8-yl group, 8-ethyltricyclo[5.2.1.0$^{2,6}$]dec-8-yl group, 8-ethyl-4-bydroxytricyclo[5.2.1.0$^{2,6}$]dec-8-yl group, 8-ethyl-4-cyanotricyclo[5.2.1.0$^{2,6}$]dec-8-yl group, 1-methylcyclopentyl group, 1-ethylcyclopentyl group, 1-methylcyclohexyl group, 1-ethylcyclohexyl group, 2-methylcyclopentyl group, 2-ethylcyclopentyl group, 2-methylbicyclo[2.2.1]hept-2-yl group, 2-methyl-5(6)-hydroxybicyclo[2.2.1]hept-2-yl group, 2-methyl-5(6)-cyanobicyclo[2.2.1]hept-2-yl group, 2-ethylbicyclo[2.2.1]hept-2-yl group, 2-ethyl-5(6)-hydroxybicyclo[2.2.1]hept-2-yl group, 2-ethyl-5(6)-cyanobicyclo[2.2.1]hept-2-yl group, 4-methyl-tetracyclo[6.2.1.1$^{3,6}$.0$^{2,7}$]dodec-4-yl group, 4-methyl-9(10)-hydroxytetracyclo[6.2.1.1$^{3,6}$.0$^{2,7}$]dodec-4-yl group, 4-methyl-9(10)-cyanotetracyclo[6.2.1.1$^{3,6}$.0$^{2,7}$]dodec-4-yl group, 4-ethyl-tetracycio[6.2.1.1$^{3,6}$.0$^{2,7}$]dodec-4-yl group, 4-ethyl-9(10)-hydroxytetracyclo[6.2.1.1$^{3,6}$.0$^{2,7}$]dodec-4-yl group, and 4-ethyl-9(10)-cyanotetracyclo[6.2.1.1$^{3,6}$.0$^{2,7}$]dodec-4-yl group; a dialkylcycloalkylmethyl group such as a 1-cyclopentyl-1-methylethyl group, 1-cyclohexyl-1-methylethyl group, 1-cycloheptyl-1-methylethyl group, 1-bicyclo[2.2.1]hept-2-yl-1-methylethyl group, 1-tricyclo[5.2.1.0$^{2,6}$]dec-8-yl-1-methylethyl group, 1-tetracyclo[7.5.2.1.0$^{2,7}$]dodec-4-yl-1-methylethyl group, 1-adamant-1-yl-1-methylethyl group, 1-(2(3)-hydroxycyclopentyl) 1-methylethyl group, 1-(3(4)-hydroxycyclohexyl)-1-methylethyl group, 1-(3(4)-hydroxycycloheptyl)-1-methylethyl group, 1-(5(6)-hydroxybicyclo[2.2.1]hept-2-yl)-1-methylethyl group, 1-(4-hydroxytricyclo[5.2.1.0$^{2,6}$]dec-8-yl)-1-methylethyl group, 1-(9(10)-hydroxytetracyclo[6.2.1.1$^{3,6}$.0$^{2,7}$]dodec-4-yl)-1-methylethyl group, 1-(3-hydroxyadamant-1-yl)-1-methylethyl group, 1-(2(3)-cyanocyclopentyl)-1-methylethyl group, 1-(3(4)-cyanocyclohexyl)-1-methylethyl group, 1-(3(4)-cyanocycloheptyl)-1-methylethyl group, 1-(5(6)-cyanobicyclo[2.2.1]hept-2-yl)-1-methylethyl group, 1-(4-cyanotricyclo[5.2.1.0$^{2,6}$]dec-8-yl)-1-methylethyl group, 1-(9(10)-cyanotetracyclo[6.2.1.1$^{3,6}$.0$^{2,7}$]dodec-4-yl)-1-methylethyl group, and 1-(3-cyanoadamant-1-yl)-1-methylethyl group; an alkyldicycloalkylmethyl group such as a 1,1-dicyclopentylethyl group, 1,1-dicyclohexylethyl group, 1,1-dicycloheptylethyl group, 1,1-dibicyclo[2.2.1]hept-2-ylethyl group, 1,1-ditricyclo[5.2.1.0$^{2,6}$]dec-8-ylethyl group, 1,1-di(tetracyclo[6.2.1.1$^{3,6}$.0$^{2,7}$]dodec-4-yl)ethyl group, 1,1-diadamant-1-ylethyl group, 1,1-di(2(3)-hydroxycyclopentyl)ethyl group, 1,1-di(3(4)-hydroxycyclohexyl)ethyl group, 1,1-di(3(4)-hydroxycycloheptyl)ethyl group, 1,1-di(5(6)-hydroxybicyclo[2.2.1]hept-2-yl)ethyl group, 1,1-di(4-hydroxytricyclo[5.2.1.0$^{2,6}$]dec-8-yl)ethyl group, 1,1-di(9(10)-hydroxytetracyclo[6.2.1.1$^{3,6}$.0$^{2,7}$]dodec-4-yl) ethyl group, 1,1-di(3-hydroxyadamant-1-yl)ethyl group, 1,1-di(2(3)-cyanocyclopentyl)ethyl group, 1,1-di(3(4)-cyanocyclohexyl)ethyl group, 1,1-di(3(4)-cyanocycloheptyl)ethyl group, 1,1-di(5(6)-cyanobicyclo[2.2.1]hept-2-yl)ethyl group, 1,1-di(4-cyanotricyclo[5.2.1.0$^{2,6}$]dec-8-yl)ethyl group, 1,1-di(9(10)-cyanotetracyclo[6.2.1.1$^{3,6}$.0$^{2,7}$]dodec-4-yl)ethyl group, and 1,1-di(3-cyanoadamant-1-yl)ethyl group; and the like.

As the functional group side chain —$C(R^5)_3$ or —$C(R^{11})_3$, a t-butyl group, 2-methyl-2-propyl group, 2-methyl-2-butyl group, 2-ethyl-2-butyl group, 3-ethyl-3-butyl group, 2-methyladamant-2-yl group, 2-methyl-3-hydroxyadamant-2-yl group, 2-ethyladamant-2-yl group, 8-methyltricyclo[5.2.1.0$^{2,6}$]dec-8-yl group, 8-ethyltricyclo[5.2.1.0$^{2,6}$]dec-8-yl group, 1-methylcyclopentyl group, 1-ethylcyclopentyl group, 1-methylcyclohexyl group, 1-ethylcyclohexyl group, 2-methylbicyclo[2.2.1]hept-2-yl group, 2-ethylbicyclo[2.2.1]hept-2-yl group, 4-methyl-tetracyclo[6.2.1.1$^{3,6}$.0$^{2,7}$]dodec-4-yl group, 4-ethyl-tetracyclo[6.2.1.1$^{3,6}$.0$^{2,7}$]dodec-4-yl group, 1-cyclohexyl-1-methylethyl group, 1-bicyclo[2.2.1]hept-2-yl-1-methylethyl group, 1-tricyclo[5.2.1.0$^{2,6}$]dec-8-yl-1-methylethyl group, 1-tetracyclo[6.2.1.1$^{3,6}$.0$^{2,7}$]dodec-4-yl-1-methylethyl group, 1-adamant 1-yl-1-methylethyl group, 1-(2(3)-hydroxycyclopentyl)-1-methylethyl group, 1-(3(4)-hydroxycyclohexyl)-1-methylethyl group, 1-(3(4)-hydroxycycloheptyl)-1-methylethyl group, 1-(3-hydroxyadamant-1-yl)-1-methylethyl group, 1,1-dicyclohexylethyl group, 1,1-dibicyclo[2.2.1]hept-2-ylethyl group, 1,1-ditricyclo[5.2.1.0$^{2,6}$]dec-8-ylethyl group, 1,1-di (tetracyclo[6.2.11$^{3,6}$.0$^{2,7}$]dodec-4-yl)ethyl group, 1,1-diadamant-1-ylethyl group, and the like are particularly preferable.

As examples of the alkyl group having a linear, branched, or alicyclic skeleton represented by $R^6$ in the side chain (1-4) and $R^{12}$ in the side chain (2-3), the: following groups can be given.

Illustrative examples of the linear or branched alkyl groups include, but are not limited to: a methyl group, ethyl group, n-propyl group, i-propyl group, n-butyl group, 2-methylpropyl group, 1-methylpropyl group, n-pentyl group, n-hexyl group, and the like.

Examples of the alkyl group having an alicyclic skeleton include the following: monovalent organic groups derived from cycloalkanes such as cyclopentane, cyclohexane, cycloheptane, and cyclooctane, or derivatives thereof; groups derived from polyalicyclic hydrocarbons such as adamantane, bicyclo[2.2.1]heptane, 7,7-dimethylbicyclo [2.2.1]heptane, tricyclo[5.2.1.0$^{2,6}$]decane, and tetracyclo [6.2.1.1$^{3,6}$.0$^{2,7}$]dodecane or derivatives thereof.

Of these, a methyl group, ethyl group, groups derived from cycloalkanes such as cyclopentane, cyclohexane, cycloheptane, and cyclooctane, groups derived from adamantane, bicyclo[2.2.1]heptane, 7,7-dimethylbicyclo [2.2.1]heptane, tricyclo[5.2.1.0$^{2,6}$]decane, and the like are preferable as $R^6$ in the side chain (1-4) and $R^{12}$ in the side chain (2–3).

R$^6$ in the side chain (1–4) and R$^{12}$ in the side chain (2—3) may represent a lactone skeleton which may have a substituent shown by the above formulas (1-4-1) to (1-4-3), for example. In the above formulas (1-4-1) to (1-4-3), R$^7$, R$^8$, and R$^9$ individually represent a hydrogen atom or a linear or branched alkyl group or alkoxy group having 1–5 carbon atoms.

As examples of the linear or branched alkyl group having 1–5 carbon atoms represented by R$^7$ or R$^8$ in the formulas (1-4-1) and (1-4-2), a methyl group, ethyl group, n-propyl group, i-propyl group, n-butyl group, 1-methylpropyl group, 2-methylpropyl group, t-butyl group, n-pentyl group, and the like can be given.

As examples of the linear or branched alkoxyl group having 1–5 carbon atoms, a methoxy group, ethoxy group, n-propoxy group, i-propoxy group, n-butoxy group, 1-methylpropoxy group, 2-methylpropoxy group, t-butoxy group, n-pentyloxy group, and the like can be given.

As preferable examples of the side chains (1–4) and (2–3), indicated as a residue bonded to oxygen, an alkyl group such as a methyl group, ethyl group, n-propyl group, cyclopentyl group, cyclohexyl group, adamant-1-yl group, bicyclo[2.2.1]hept-2-yl group, 7,7-dimethylbicyclo[2.2.1]hept-1-yl group, tricyclo[5.2.1.0$^{2,6}$]dec-8-yl group, and tetracyclo[6.2.1.1$^{3,6}$.0$^{2,7}$]dodec-4-yl group; a lactone group such as a 5-oxo-4-oxa-tricyclo[4.2.1.0$^{2,7}$]non-2-yl group, 9-methoxycarbonyl-5-oxo4-oxa-tricyclo[4.2.1.0$^{3,7}$]non-2-yl group, 7-oxo-6-oxa-bicyclo[3.2.1]oct-4-yl group, 2-methoxycarbonyl-7-oxo-6-oxa-bicyclo[3.2.1]oct-4-yl group, 2-oxotetrahydropyran-4-yl group, 4-methyl-2-oxotetrahydropyran-4-yl group, 4-ethyl-2-oxotetrahydropyran-4-yl group, 4-propyl-2-oxotetrahydropyran-4-yl group, 5-oxotetrahydrofuran-3-yl group, 2,2-dimethyl-5-okotetrahydrofuran-3-yl group, 4,4-dimethyl-5-oxotetrahydrofuran-3-yl group, 2-oxotetrahydrofuran-3-yl group, 4,4-dimethyl-2-oxotetrahydrofuran-3-yl group, 5,5-dimethyl-2-oxotetrahydrofuran-3-yl group, 2-oxotetrahydrofuran-3-yl group, 5-oxotetrahydrofuran-2-ylmethyl group, 3,3-dimethyl-5-oxotetrahydrofuran-2-ylmethyl group, and 4,4-dimethyl-5-oxotetrahydrofuran-2-ylmethyl group; and the like can be given.

Preferable examples of the monomer A shown by formula (1), which is an unsaturated alicyclic compound which forms the polymer main chain by dissociation of the unsaturated bond, include: 5-hydroxymethylbicyclo[2.2.1]hept-2-ene, 5-(2-hydroxyethyl)bicyclo[2.2.1]hept-2-ene, 5-(3-hydroxypropyl)bicyclo[2.2.1]hept-2-ene, 5-(1-fluoro-1-hydroxymethyl)bicyclo[2.2.1]hept-2-ene, 5-(1,1-difluoro-1-hydroxymethyl)bicyclo[2.2.1]hept-2-ene, 5-(1,2-difluoro-2-hydroxymethyl)bicyclo[2.2.1]hept-2-ene, 5-(1,1,2,2-tetrafluoro-2-hydroxymethyl)bicyclo[2.2.1]hept-2-ene, 5-(2-trifluoromethyl-2-hydroxyethyl)bicyclo[2.2.1]hept-2-ene, 5-(2,2-ditrifluoromethyl-2-hydroxyethyl)bicyclo[2.2.1]hept-2-ene, bicyclo[2.2.1]hept-2-ene, 5-methylbicyclo[2.2.1]hept-2-ene, 5-ethylbicyclo[2.2.1]hept-2-ene, 5-butylbicyclo[2.2.1]hept-2-ene, 5-hexylbicyclo[2.2.1]hept-2-ene, 5-octylbicyclo[2.2.1]hept-2-ene, 5-hydroxybicyclo[2.2.1]hept-2-ene, bicyclo[2.2.1]hept-2-ene-5-carboxylic acid (3-hydroxyadamant-1-yl) ester, bicyclo[2.2.1]hept-2-ene-5-carboxylic acid (5(6)-hydroxybicyclo[2.2.1]hept-2-yl) ester, bicyclo[2.2.1]hept-2-ene-5-carboxylic acid (9(10)-hydroxytetracyclo[6.2.1.1$^{3,6}$.0$^{2,7}$]dodec-4-yl) ester, bicyclo[2.2.1]hept-2-ene-5-carboxylic acid, bicyclo[2.2.1]hept-2-ene-5-acetic acid, 5-cyanobicyclo[2.2.1]hept-2-ene, 5-cyanomethylbicyclo[2.2.1]hept-2-ene, 5-(2-cyanoethyl)bicyclo[2.2.1]hept-2-ene, 5-(3-cyanopropyl)bicyclo[2.2.1]hept-2-ene, bicyclo[2.2.1]hept-2-ene-5-carboxylic acid t-butyl ester, bicyclo[2.2.1]hept-2-ene-5-carboxylic acid (2-methyl-2-propyl) ester, bicyclo[2.2.1]hept-2-ene-5-carboxylic acid (2-methyl-2-butyl group, 2-ethyl-2-butyl) ester, bicyclo[2.2.1]hept-2-ene-5-carboxylic acid (3-ethyl-3-butyl) ester, bicyclo[2.2.1]hept-2-ene-5-carboxylic acid (2-methyladamant-2-yl) ester, bicyclo[2.2.1]hept-2-ene-5-carboxylic acid (2-methyl-3-hydroxyadamant-2-yl) ester, bicyclo[2.2.1]hept-2-ene-5-carboxylic acid (2-ethyladamant-2-yl) ester, bicyclo[2.2.1]hept-2-ene-5-carboxylic acid (8-methyltricyclo[5.2.1.0$^{2,6}$]dec-8-yl) ester, bicyclo[2.2.1]hept-2-ene-5-carboxylic acid (8-ethyltricyclo[5.2.1.0$^{2,6}$]dec-8-yl) ester, bicyclo[2.2.1]hept-2-ene-5-carboxylic acid (1-methylcyclopentyl) ester, bicyclo[2.2.1]hept-2-ene-5-carboxylic acid (1-ethylcyclopentyl) ester, bicyclo[2.2.1]hept-2-ene-5-carboxylic acid (1-methylcyclohexyl) ester, bicyclo[2.2.1]hept-2-ene-5-carboxylic acid (1-ethylcyclohexyl) ester, bicyclo[2.2.1]hept-2-ene-5-carboxylic acid (2-methylbicyclo[2.2.1]hept-2-yl) ester, bicyclo[2.2.1]hept-2-ene-5-carboxylic acid (2-ethylbicyclo[2.2.1]hept-2-yl) ester, bicyclo[2.2.1]hept-2-ene-5-carboxylic acid (4-methyl-tetracyclo[6.2.1.1$^{3,6}$.0$^{2,7}$]dodec-4-yl) ester, bicyclo[2.2.1]hept-2-ene-5-carboxylic acid (4-ethyl-tetracyclo[6.2.1.1$^{3,6}$.0$^{2,7}$]dodec-4-yl) ester, bicyclo[2.2.1]hept-2-ene-5-carboxylic acid (1-cyclohexyl-1-methyl ethyl) ester, bicyclo[2.2.1]hept-2-ene-5-carboxylic acid (1-bicyclo[2.2.1]hept-2-yl-1-methylethyl) ester, bicyclo[2.2.1]hept-2-ene-5-carboxylic acid (1-tricyclo[5.2.1.0$^{2,6}$]dec-8-yl-1-methylethyl) ester, bicyclo[2.2.1]hept-2-ene-5-carboxylic acid (1-tetracyclo[6.2.1.1$^{3,6}$.0$^{2,7}$]dodec-4-yl-1-methylethyl) ester, bicyclo-[2.2.1]hept-2-ene-5-carboxylic acid (1-adamant-1-yl-1-methylethyl) ester, bicyclo[2.2.1]hept-2-ene-5-carboxylic acid (1-(2(3)-hydroxycyclopentyl)-1-methylethyl) ester, bicyclo[2.2.1]hept-2-ene-5-carboxylic acid (1-(3(4)-hydroxycyclohexyl)-1-methylethyl) ester, bicyclo[2.2.1]hept-2-ene-5-carboxylic acid (1-(3(4)-hydroxycycloheptyl)-1-methylethyl) ester, bicyclo[2.2.1]hept-2-ene-5-carboxylic acid (1-(3-hydroxyadamant-1-yl)-1-methylethyl group, 1,1-dicyclohexylethyl) ester, bicyclo[2.2.1]hept-2-ene-5-carboxylic acid (1,1-dibicyclo[2.2.1]hept-2-ylethyl) ester, bicyclo[2.2.1]hept-2-ene-5-carboxylic acid (1,1-ditricyclo[5.2.1.0$^{2,6}$]dec-8-ylethyl) ester, bicyclo[2.2.1]hept-2-ene-5-carboxylic acid (1,1-di(tetracyclo[6.2.1.1$^{3,6}$.0$^{2,7}$]dodec-4-yl)ethyl) ester, bicyclo[2.2.1]hept-2-ene-5-carboxylic acid (1,1-diadamant-1-ylethyl) ester, bicyclo[2.2.1]hept-2-ene-5-carboxylic acid methyl ester, bicyclo[2.2.1]hept-2-ene-5-carboxylic acid ethyl ester, bicyclo[2.2.1]hept-2-ene-5-carboxylic acid n-propyl ester, bicyclo[2.2.1]hept-2-ene-5-carboxylic acid cyclopentyl ester, bicyclo[2.2.1]hept-2-ene-5-carboxylic acid cyclohexyl ester, bicyclo[2.2.1]hept-2-ene-5-carboxylic acid (adamant-1-yl) ester, bicyclo[2.2.1]hept-2-ene-5-carboxylic acid (bicyclo[2.2.1]hept-2-yl) ester, bicyclo[2.2.1]hept-2-ene-5-carboxylic acid (7,7-dimethylbicyclo[2.2.1]hept-1-yl) ester, bicyclo[2.2.1]hept-2-ene-5-carboxylic acid (tricyclo[5.2.1.0$^{2,6}$]dec-8-yl) ester, bicyclo[2.2.1]hept-2-ene-5-carboxylic acid (tetracyclo[6.2.1.1$^{3,6}$.0$^{2,7}$]dodec-4-yl) ester, bicyclo[2.2.1]hept-2-ene-5-carboxylic acid (5-oxo4-oxa-tricyclo[4.2.1.0$^{3,7}$]non-2-yl) ester, bicyclo[2,2.1]hept-2-ene-5-carboxylic acid (9-methoxycarbonyl-5-oxo4-oxa-tricyclo[4.2.1.0$^{3,7}$]non-2-yl) ester, bicyclo[2.2.1]hept-2-ene-5-carboxylic acid (7-oxo-6-oxa-bicyclo[3.2.1]oct-4-yl) ester, bicyclo[2.2.1]hept-2-ene-5-carboxylic acid (2-methoxycarbonyl-7-oxo-6-oxa-bicyclo[3.2.1]oct-4-yl) ester, bicyclo[2.2.1]hept-2-ene-5-carboxylic acid (2-oxotetrahydropyran-4-yl) ester, bicyclo[2.2.1]hept-2-ene-carboxylic acid (4-methyl-2- oxotetrahydropyran4-yl) ester, bicyclo[2.2.1]hept-2-ene-5-carboxylic acid (4-ethyl-2-oxotetrahydropyran-4-yl) ester, bicyclo[2.2.1]hept-2-ene-5-carboxylic acid (4-propyl-2-oxotetrahydropyran-4-yl) ester, bicyclo[2.2.1]hept-2-ene-5-carboxylic acid (5-oxotetrahydrofuran-3-yl) ester;, bicyclo[2.2.1]hept-2-ene-5-carboxylic acid (2,2-dimethyl-5-oxotetrahydrofuran-3-yl) ester, bicyclo[2.2.1]hept-2-ene-5-carboxylic acid (4,4-dimethyl-5-oxotetrahydrofuran-3-yl) ester, bicyclo[2.2.1]hept-2-ene-5-carboxylic acid (2-oxotetrahydrofuran-3-yl) ester, bicyclo[2.2.1]hept-2-ene-5-carboxylic acid (4,4-dimethyl-2-oxotetrahydrofuran-3-yl) ester, bicyclo[2.2.1]hept-2-ene-5-carboxylic acid (5,5-dimethyl-2-oxotetrahydrofuran-3-yl) ester, bicyclo[2.2.1]hept-2-ene-5-carboxylic acid (2-oxotetrahydrofuran-3-yl) ester, bicyclo[2.2.1]hept-2-ene-5-carboxylic acid (5-oxotetrahydrofuran-2-ylmethyl) ester, bicyclo[2.2.1]hept-2-ene-5-carboxylic acid (3,3-dimethyl-5-oxotetrahydrofuran-2-ylmethyl) ester, bicyclo[2.2.1]hept-2-ene-5-carboxylic acid (4,4-dimethyl-5-oxotetrahydrofuran-2-ylmethyl) ester, 9-hydroxymethyltetracyclo[6.2.1.1$^{3,6}$.0$^{2,7}$]dodec-4-ene, 9-(2-hydroxyethyl)tetracyclo[6.2.1.1$^{3,6}$.0$^{2,7}$]dodec-4-ene, 9-(3-hydroxypropyl)tetracyclo[6.2.1.1$^{3,6}$.0$^{2,7}$]dodec-4-ene, 9-(1-fluoro-1-hydroxymethyl)tetracyclo[6.2.1.1$^{3,6}$.0$^{2,7}$]dodec-4-ene, 9-(1,1-difluoro-1-hydroxymethyl)tetracyclo[6.2.1.1$^{3,6}$.0$^{2,7}$]dodec-4-ene, 9-(1,2-difluoro-2-hydroxymethyl)tetracyclo[6.2.1.1$^{3,6}$.0$^{2,7}$]dodec-4-ene, 9-(1,1,2,2-tetrafluoro-2-hydroxymethyl)tetracyclo[6.2.1.1$^{3,6}$.0$^{2,7}$]dodec-4-ene, 9-(2-trifluoromethyl-2-hydroxyethyl)tetracyclo[6.2.1.1$^{3,6}$.0$^{2,7}$]dodec-4-ene, 9-(2,2-ditrifluoromethyl-2-hydroxyethyl)tetracyclo[6.2.1.1$^{3,6}$.0$^{2,7}$]dodec-4-ene, tetracyclo[6.2.1.1$^{3,6}$.0$^{2,7}$]dodec-4-ene, 9-methyl-tetracyclo[6.2.1.1$^{3,6}$.0$^{2,7}$]dodec-4-ene, 9-ethyltetracyclo[6.2.1.1$^{3,6}$.0$^{2,7}$]dodec-4-ene, 9-butyltetracyclo[6.2.1.1$^{3,6}$.0$^{2,7}$]dodec-4-ene, 9-hexyltetracyclo[6.2.1.1$^{3,6}$.0$^{2,7}$]dodec-4-ene, 9-octyltetracyclo[6.2.1.1$^{3,6}$.0$^{2,7}$]dodec-4-ene, 9-hydroxytetracyclo[6.2.1.1$^{3,6}$.0$^{2,7}$]dodec-4-ene, tetracyclo[6.2.1.1$^{3,6}$.0$^{2,7}$]dodec-4-ene-9-carboxylic acid (3-hydroxyadamant-1-yl) ester, tetracyclo[6.2.1.1$^{3,6}$.0$^{2,7}$]dodec-4-ene-9-carboxylic acid (5(6)-hydroxybicyclo[2.2.1]hept-2-yl) ester, tetracyclo[6.2.1.1$^{3,6}$.0$^{2,7}$]dodec-4-ene-9-carboxylic acid (9(10)-hydroxytetracyclo[6.2.1.1$^{3,6}$.0$^{2,7}$]dodec-4-yl) ester, tetracyclo[6.2.1.1$^{3,6}$.0$^{2,7}$]dodec-4-ene-9-carboxylic acid, tetracyclo[6.2.1.1$^{3,6}$.0$^{2,7}$]dodec-4-ene-9-acetic acid, cyanotetracyclo[6.2.1.1$^{3,6}$.0$^{2,7}$]dodec-4-ene, 9-cyanomethyltetracyclo[6.2.1.1$^{3,6}$.0$^{2,7}$]dodec-4-ene, 9-(2-cyanoethyl)tetracyclo[6.2.1.1$^{3,6}$.0$^{2,7}$]dodec-4-ene, 9-(3-cyanopropyl)tetracyclo[6.2.1.1$^{3,6}$.0$^{2,7}$]dodec-4-ene, tetracyclo[6.2.1.1$^{3,6}$.0$^{2,7}$]dodec-4-ene-9-carboxylic acid t-butyl ester, tetracyclo[6.2.1.1$^{3,6}$.0$^{2,7}$]dodec-4-ene-9-carboxylic acid (2-methyl-2-propyl) ester, tetracyclo[6.2.1.1$^{3,6}$.0$^{2,7}$]dodec-4-ene-9-carboxylic acid (2-methyl-2-butyl group, 2-ethyl-2-butyl) ester, tetracyclo[6.2.1.1$^{3,6}$.0$^{2,7}$]dodec-4-ene-9-carboxylic acid (3-ethyl-3-butyl) ester, tetracyclo[6.2.1.1$^{3,6}$.0$^{2,7}$]dodec-4-ene-9-carboxy acid (2-methyladamant-2-yl) ester, tetracyclo[6.2.1.1$^{3,6}$.0$^{2,7}$]dodec-4-ene-9-carboxylic acid (2-methyl-3-hydroxyadamant-2-yl) ester, tetracyclo[6.2.1.1$^{3,6}$.0$^{2,7}$]dodec-4-ene-9-carboxylic acid (2-ethyladamant-2-yl) ester, tetracyclo[6.2.1.1$^{3,6}$.0$^{2,7}$]dodec-4-ene-9-carboxylic acid (8-methyltricyclo[5.2.1.0$^{2,6}$]dec-8-yl) ester, tetracyclo[6.2.1.1$^{3,6}$.0$^{2,7}$]dodec-4-ene-9-carboxylic acid (8-ethyltricyclo[5.2.1.0$^{2,6}$]dec-8-yl) ester, tetracyclo[6.2.1.1$^{3,6}$.0$^{2,7}$]dodec-4-ene-9-carboxylic acid (1-methylcyclopentyl) ester, tetracyclo[6.2.1.1$^{3,6}$.0$^{2,7}$]dodec-4-ene-9-carboxylic acid (1-ethylcyclopentyl) ester, tetracyclo[6.2.1.1$^{3,6}$.0$^{2,7}$]dodec-4-ene-9-carboxylic acid (1-methylcyclohexyl) ester, tetracyclo[6.2.1.1$^{3,6}$.0$^{2,7}$]dodec-4-ene-9-carboxylic acid (1-ethylcyclohexyl) ester, tetracyclo[6.2.1.1$^{3,6}$.0$^{2,7}$]dodec-4-ene-9-carboxylic acid (2-methylbicyclo[2.2.1]hept-2-yl) ester, tetracyclo[6.2.1.1$^{3,6}$.0$^{2,7}$]dodec-4-ene-9-carboxylic acid (2-ethylbicyclo[2.2.1]hept-2-yl) ester, tetracyclo[6.2.1.1$^{3,6}$.0$^{2,7}$]dodec-4-ene-9-carboxylic acid (4-methyl-tetracyclo[6.2.1.1$^{3,6}$.0$^{2,7}$]dodec-4-yl) ester, tetracyclo[6.2.1.1$^{3,6}$.0$^{2,7}$]dodec-4-ene-9-carboxylic acid (4-ethyl-tetracyclo[6.2.1.1$^{3,6}$.0$^{2,7}$]dodec-4-yl) ester, tetracyclo[6.2.1.1$^{3,6}$.0$^{2,7}$]dodec-4-ene-9-carboxylic acid (1-cyclohexyl-1-methylethyl) ester, tetracyclo[6.2.1.1$^{3,6}$.0$^{2,7}$]dodec-4-ene-9-carboxylic acid (1-bicyclo[2.2.1]hept-2-yl-1-methylethyl) ester, tetracyclo[6.2.1.1$^{3,6}$.0$^{2,7}$]dodec-4-ene-9-carboxylic acid (1-tricyclo[5.2.1.0$^{2,6}$]dodec-8-yl-1-methylethyl) ester, tetracyclo[6.2.1.1$^{3,6}$.0$^{2,7}$]dodec-4-ene-9-carboxylic acid (1-tetracyclo[6.2.1.1$^{3,6}$.0$^{2,7}$]dodec-4-yl-1-ethylethyl) ester, tetracyclo[6.2.1.1$^{3,6}$.0$^{2,7}$]dodec-4-ene-9-carboxylic acid (1-adamant-1-yl-1-methylethyl) ester, tetracyclo[6.2.1.1$^{3,6}$.0$^{2,7}$]dodec-4-ene-9-carboxylic acid (1-(2(3)-hydroxycyclopentyl)-1-methylethyl) ester, tetracyclo[6.2.1.1$^{3,6}$.0$^{2,7}$]dodec-4-ene-9-carboxylic acid (1-(3(4)-hydroxycyclohexyl)-1-methylethyl) ester, tetracyclo[6.2.1.1$^{3,6}$.0$^{2,7}$]dodec-4-ene-9-carboxylic acid (1-(3(4)-hydroxycycloheptyl)-1-methylethyl) ester, tetracyclo[6.2.1.1$^{3,6}$.0$^{2,7}$]dodec-4-ene-9-carboxylic acid (1-(3-hydroxyadamant-1-yl)-1-methylethyl) ester, tetracyclo[6.2.1.1$^{3,6}$.0$^{2,7}$]dodec-4-ene-9-carboxylic acid (1,1-dicyclohexylethyl) ester, tetracyclo[6.2.1.1$^{3,6}$.0$^{2,7}$]dodec-4-ene-9-carboxylic acid (1,1-dibicyclo[2.2.1]hept-2-ylethyl) ester, tetracyclo[6.2.1.1$^{3,6}$.0$^{2,7}$]dodec-4-ene-9-carboxylic acid (1,1-ditricyclo[5.2.1.0$^{2,6}$]dodec-8-ylethyl) ester, tetracyclo[6.2.1.1$^{3,6}$.0$^{2,7}$]dodec-4-ene-9-carboxylic acid (1,1-di(tetracyclo[6.2.1.1$^{3,6}$.0$^{2,7}$]dodec-4-yl)ethyl) ester, tetracyclo[6.2.1.1$^{3,6}$.0$^{2,7}$]dodec-4-ene-9-carboxylic acid (1,1-diadamant-1-ylethyl) ester, tetracyclo[6.2.1.1$^{3,6}$.0$^{2,7}$]dodec-4-ene-9-carboxylic acid methyl ester, tetracyclo[6.2.1.1$^{3,6}$.0$^{2,7}$]dodec-4-ene-9-carboxylic acid ethyl ester, bicyclo[2.2.1]hept-2-ene-5-carboxylic acid n-propyl ester, tetracyclo[6.2.1.1$^{3,6}$.0$^{2,7}$]dodec-4-ene-9-carboxylic acid cyclopentyl ester, tetracyclo[6.2.1.1$^{3,6}$.0$^{2,7}$]dodec-4-ene-9-carboxylic acid cyclohexyl ester, tetracyclo[6.2.1.1$^{3,6}$.0$^{2,7}$]dodec-4-ene-9-carboxylic acid (adamant-1-yl) ester, tetracyclo[6.2.1.1$^{3,6}$.0$^{2,7}$]dodec-4-ene-9-carboxylic acid (bicyclo[2.2.1]hept-2-yl) ester, tetracyclo[6.2.1.1$^{3,6}$.0$^{2,7}$]dodec-4-ene-9-carboxylic acid (7,7-dimethylbicyclo[2.2.1]hept-1-yl) ester, tetracyclo[6.2.1.1$^{3,6}$.0$^{2,7}$]dodec-4-ene-9-carboxylic acid (tricyclo[5.2.1.0$^{2,6}$]dec-8-yl) ester, tetracyclo[6.2.1.1$^{3,6}$.0$^{2,7}$]dodec-4-ene-9-carboxylic acid (tetracyclo[6.2.1.1$^{3,6}$.0$^{2,7}$]dodec-4-yl) ester, tetracyclo[6.2.1.1$^{3,6}$.0$^{2,7}$]dodec-4-ene-9-carboxylic acid (5-oxo4-oxa-tricyclo[4.2.1.0$^{3,7}$]non-2-yl) ester, tetracyclo[6.2.1.1$^{3,6}$.0$^{2,7}$]dodec-4-ene-9-carboxylic acid (9-methoxycarbonyl-5-oxo-4-oxa-tricyclo[4.2.1.0$^{3,7}$]non-2-yl) ester, tetracyclo[6.2.1.1$^{3,6}$.0$^{2,7}$]dodec-4-ene-9-carboxylic acid (7-oxo-6-oxa-bicyclo[3.2.1]oct-4-yl) ester, tetracyclo[6.2.1.1$^{3,6}$.0$^{2,7}$]dodec-4-ene-9-carboxylic acid (2-methoxycarbonyl-7-oxo-6-oxa-bicyclo[3.2.1]oct-4-yl) ester, tetracyclo[6.2.1.1$^{3,6}$.0$^{2,7}$]dodec-4-ene-9-carboxylic acid (2-oxotetrahydropyran4-yl) ester, tetracyclo[6.2.1.1$^{3,6}$.0$^{2,7}$]dodec-4-ene-9-carboxylic acid (4-methyl-2-oxotetrahydropyran-4-yl) ester, tetracyclo[6.2.1.1$^{3,6}$.0$^{2,7}$]dodec-4-ene-9-carboxylic acid (4-ethyl-2-oxotetrahydropyran4-yl) ester, tetracyclo[6.2.1.1$^{3,6}$.0$^{2,7}$]dodec-4-ene-9-carboxylic acid (4-propyl-2-oxotetrahydrofuran-4-yl) ester, tetracyclo[6.2.1.1$^{3,6}$.0$^{2,7}$]dodec-4-ene-9-carboxylic acid (5-oxotetrahydrofuran-3-yl) ester, tetracyclo[6.2.1.1$^{3,6}$.0$^{2,7}$]dodec-4-ene-9-carboxylic acid (2,2-dimethyl-5-oxotetrahydrofuran-3-yl) ester, tetracyclo[6.2.1.1$^{3,6}$.0$^{2,7}$]dodec-4-ene-9-carboxylic acid (4,4-dimethyl-5-oxotetrahydrofuran-3-yl) ester, tetracyclo[6.2.1.1$^{3,6}$.0$^{2,7}$]dodec-4-ene-9-carboxylic acid (2-oxotetrahydrofuran-3-yl) ester, tetracyclo[6.2.1.1$^{3,6}$.0$^{2,7}$]dodec-4-ene-9-carboxylic acid (4,4-dimethyl-2-oxotetrahydrofuran-3-yl) ester, tetracyclo[6.2.1.1$^{3,6}$.0$^{2,7}$]dodec-4-ene-9-carboxylic acid (5,5-dimethyl-2-oxotetrahydrofuran-3-yl) ester, tetracyclo[6.2.1.1$^{3,6}$.0$^{2,7}$]dodec-4-ene-9-carboxylic acid (2-oxotetrahydrofuran-3-yl) ester, tetracyclo[6.2.1.1$^{3,6}$.0$^{2,7}$]dodec-4-ene-9-carboxylic acid (5-oxotetrahydrofuran-2-ylmethyl) ester, tetracyclo[6.2.1.1$^{3,6}$.0$^{2,7}$]dodec-4-ene-9-carboxylic acid (3,3-dimethyl-5-oxotetrahydrofuran-2-ylmethyl) ester, and tetracyclo[6.2.1.1$^{3,6}$.0$^{2,7}$]dodec-4-ene-9-carboxylic acid (4,4-dimethyl-5-oxotetrahydrofuran-2-ylmethyl) ester.

Preferable examples of monomer B other than monomer A shown by formula (2) which forms the polymer main chain include: hydroxymethyl acrylate, 2-hydroxymethyl 1-acrylate, 3-hydroxypropyl 1-acrylate, 1-fluoro-1-hydroxymethyl 1-acrylate, 1,1-difluoro-1-hydroxymethyl 1-acrylate, 1,2-difluoro-2-hydroxymethyl 1-acrylate, 1,1,2,2-tetrafluoro-2-hydroxymethyl 1-acrylate, 2-trifluoromethyl-2-hydroxyethyl 1-acrylate, 2,2-ditrifluoromethyl-2-hydroxyethyl 1-acrylate, acrylic acid, 3-hydroxyadamant-1-yl acrylate, 5(6)-hydroxybicyclo[2.2.1]hept-2-yl acrylate, 9(10)-hydroxytetracyclo[6.2.1.1$^{3,6}$.0$^{2,7}$]dodec-4-yl acrylate, carboxymethyl acrylate, 2-carboxyethyl acrylate, 3-carboxypropyl acrylate, 3-carboxyadamant-1-yl acrylate, 5(6)-carboxybicyclo[2.2.1]hept-2-yl acrylate, 9(10)-carboxytetracyclo[6.2.1.1$^{3,6}$.0$^{2,7}$]dodec-4-yl acrylate, cyanomethyl acrylate, 2-cyanoethyl 1-acrylate, 3-cyanopropyl 1-acrylate, 3-cyanoadamant-1-yl acrylate, 5(6)-cyanobicyclo[2.2.1]hept-2-yl acrylate, 9(10)-cyanotetracyclo[6.2.1.1$^{3,6}$.0$^{2,7}$]dodec-4-yl acrylate, t-butyl acrylate, 2-methyl-2-propyl acrylate, 2-methyl-2-butyl acrylate, 2-ethyl-2-butyl acrylate, 3-ethyl-3-butyl acrylate, 2-methyladamant-2-yl acrylate, 2-methyl-3-hydroxyadamant-2-yl acrylate, 2-ethyladamant-2-yl acrylate, 8-methyltricyclo[5.2.1.0$^{2,6}$]dec-8-yl acrylate, 8-ethyltricyclo[5.2.1.0$^{2,6}$]dec-8-yl acrylate, 1-methylcyclopentyl acrylate, 1-ethylcyclopentyl acrylate, 1-methylcyclohexyl acrylate, 1-ethylcyclohexyl acrylate, 2-methylbicyclo[2.2.1]hept-2-yl acrylate, 2-ethylbicyclo[2.2.1]hept-2-yl acrylate, 4-methyl-tetracyclo[6.2.1.1$^{3,6}$.0$^{2,7}$]dodec-4-yl acrylate, 4-ethyl-tetracyclo[6.2.1.1$^{3,6}$.0$^{2,7}$]dodec-4-yl acrylate, 1-cyclohexyl-1-methyl ethyl acrylate, 1-bicyclo[2.2.1]hept-2-yl-1-methylethyl acrylate, 1-tricyclo[5.2.1.0$^{2,6}$]dec-8-yl-1-methylethyl acrylate, 1-tetracyclo[6.2.1.1$^{3,6}$.0$^{2,7}$]dodec-4-yl-1-methylethyl acrylate, 1-adamant-1-yl-1-methylethyl acrylate, 1-(2(3)-hydroxycyclopentyl)-1-methylethyl acrylate, 1-(3(4)-hydroxycyclohexyl)-1-methylethyl acrylate, 1-(3(4)-hydroxycycloheptyl)-1-methylethyl acrylate, 1-(3-hydroxyadamant-1-yl)-1-methylethyl acrylate, 1,1-dicyclohexylethyl acrylate, 1,1-dibicyclo[2.2.1]hept-2-ylethyl acrylate, 1,1-ditricyclo[5.2.1.0$^{2,6}$]dec-8-ylethyl acrylate, 1,1-di(tetracyclo[6.2.1.1$^{3,6}$.0$^{2,7}$]dodec-4-yl)ethyl acrylate, 1,1-diadamant-1-ylethyl acrylate, methyl acrylate, ethyl acrylate, n-propyl acrylate, cyclopentyl acrylate, cyclohexyl acrylate, adamant-1-yl acrylate, bicyclo[2.2.1]hept-2-yl acrylate, 7,7-dimethylbicyclo[2.2.1]hept-1-yl acrylate, tricyclo[5.2.1.0$^{2,6}$]dec-8-yl acrylate, tetracyclo[6.2.1.1$^{3,6}$.0$^{2,7}$]dodec-4-yl acrylate, 5-oxo-4-oxa-tricyclo[4.2.1.0$^{3,7}$]non-2-yl acrylate, 9-methoxycarbonyl-5-oxo-4-oxa-tricyclo[4.2.1.0$^{3,7}$]non-2-yl acrylate, 7-oxo-6-oxa-bicyclo[3.2.1]oct-4-yl acrylate, 2-methoxycarbonyl-7-oxo-6-oxa-bicyclo[3.2.1]oct-4-yl acrylate, 2-oxotetrahydropyran-4-yl acrylate, 4-methyl-2-oxotetrahydropyran-4-yl acrylate, 4-ethyl-2-oxotetrahydropyran-4-yl acrylate, 4-propyl-2-oxotetrahydropyran-4-yl acrylate, 5-oxotetrahydrofuran-3-yl acrylate, 2,2-dimethyl-5-oxotetrahydrofuran-3-yl acrylate, 4,4-dimethyl-5-oxotetrahydrofuran-3-yl acrylate, 2-oxotetrahydrofuran-3-yl acrylate, 4,4-dimethyl-2-oxotetrahydrofuran-3-yl acrylate, 5,5-dimethyl-2-oxotetrahydrofuran-3-yl acrylate, 2-oxotetrahydrofuran-3-yl acrylate, 5-oxotetrahydrofuran-2-ylmethyl acrylate, 3,3-dimethyl-5-oxotetrahydrofuran-2-ylmethyl acrylate, 4,4-dimethyl-5-oxotetrahydrofuran-2-ylmethyl acrylate, and the like.

The resin of the present invention is preferably a polymer comprising at least one of monomer A and at least one of monomer B. The different numbers of monomers A and B employed in the present invention may vary depending on the desired resin to be produced.

The inventive resin may further comprise other monomers (referred to herein below as a third monomer C). Examples of such other ('third') monomers include, but are not limited to: monofunctional monomers such as vinyl esters such as vinyl acetate, vinyl propionate, and vinyl butyrate; unsaturated nitrile compounds such as (meth)acrylonitrile, α-chloroacrylonitrile, crotonitrile, maleinitrile, fumarnitrile, mesaconitrile, citraconitrile, and itaconitrile; unsaturated amide compounds such as (meth)acrylamide, N,N-dimethyl (meth)acrylamide, crotonamide, maleinamide, fumaramide, mesaconamide, citraconamide, and itaconamide; nitrogen-containing vinyl compounds such as N-vinyl-ε-caprolactam, N-vinylpyrrolidone, vinylpyridine, and vinylimidazole; and unsaturated carboxylic acids (anhydrides) such as crotonic acid, maleic acid, maleic anhydride, fumaric acid, itaconic acid, itaconic anhydride, citraconic acid, citraconic anhydride, and mesaconic acid; and polyfunctional monomers such as methylene glycol di(meth)acrylate, ethylene glycol di(meth)acrylate, propylene glycol di(meth)acrylate, 1,6-hexanediol di(meth)acrylate, 2,5-dimethyl-2,5-hexanediol di(meth)acrylate, 1,8-octanediol di(meth) acrylate, 1,9-nonanediol di(meth)acrylate, 1,4-bis(2-hydroxypropyl)benzene di(meth)acrylate, 1,3-bis(2-hydroxypropyl)benzene di(meth)acrylate, 1,2-adamantanediol di(meth)acrylate, 1,3-adamantanediol di(meth)acrylate, 1,4-adamantanediol di(meth)acrylate, and tricyclodecanyldimethylol di(mieth)acilyate.

In the production of the copolymer of the present invention, the feed molar ratio of monomer A to monomer B (monomer A/monomer B) is greater than 1 and preferably greater than 2. By employing such a feed ratio, the free radical polymerization step of the present invention, i.e., the reacting step, is ensured to be carried out using a stoichiometric excess of monomer A as compared to monomer B. If during the course of the reacting step, the monomer A molar concentration falls below a stoichiometric excess, additional monomer A can be added.

When the reacting step includes a third monomer as described above, i.e., monomer C, the reacting step is carried out using a feed ratio, in terms of molar concentration of monomer A: monomer B: monomer C of greater than 2:1:1, preferably 4:1:1.

The resin according to the present invention is obtained by copolymerizing the monomers by successively adding an organic solvent containing either monomer A or monomer B to an organic solvent containing the other monomer.

In the present invention, the organic solvent containing the monomer includes (1) a case where the monomer is dissolved in an organic solvent to form an organic solvent solution, and (2) a case where the monomer is dispersed, suspended, or emulsified in an organic solvent, but forms an organic solvent solution by the addition of an organic solvent containing the other monomer.

An organic solvent which can be used as the polymerization solvent of the present invention is a solvent which allows the monomer to be dissolved or a solvent which allows the monomer to be dispersed, suspended, or emulsified. In addition to the above conditions, a solvent which allows the resulting copolymer to be dissolved is preferable. Suitable solvents which can be used for copolymerization include, but are not limited to: alkanes such as n-pentane, n-hexane, n-heptane, n-octane, n-nonane, and n-decane; cycloalkanes such as cyclohexane, cycloheptane, cyclooctane, decalin, and norbomane; aromatic hydrocarbons such as benzene, toluene, xylene, ethylbenzene, and cumene; halogenated hydrocarbons such as chlorobutanes, bromohexanes, dichloroethanes, hexamethylene dibromide, and chlorobenzene; saturated carboxylic acid esters such as ethyl acetate, n-butyl acetate, i-butyl acetate, methyl propionate, and propylene glycol monomethyl ether acetate; alkyllactones such as γ-butyrolactone; ethers such as tetrahydrofuran, dimethoxyethanes, and diethoxyethanes; alkylketones such as 2-butanone, 2-heptanone, and methyl isobutyl ketone; cycloalkylketones such as cyclohexanone; alcohols such as 2-propanol and propylene glycol monomethyl ether; and the like. Of these solvents, at least one solvent selected from the group consisting of 2-butanone, 2-heptanone, methyl isobutyl ketone, propylene glycol monomethyl ether acetate, propylene glycol monomethyl ether, n-butyl acetate, i-butyl acetate, 2-propanol, and γ-butyrolactone is preferable since such a solvent excels in solubility for the monomer and polymer and does not inhibit the polymerization reaction.

The concentration of the organic solvent solution of monomer A and monomer B is preferably 10–60 wt %. If the concentration is less than 10 wt %, the polymerization rate may be decreased. If the concentration exceeds 60 wt %, the flow of the polymerization reaction solution may be decreased, whereby handling of the solution becomes difficult in the treatment after the completion of the reaction.

The monomers are copolymerized by adding an initiator to the organic solvent containing monomer A or monomer B. In addition, a conventional chain transfer agent may be allowed to be present together with the radical polymerization initiator. In the present invention, no Lewis acid promoter or co-ordination catalyst need be employed during the reacting of monomer A and monomer B.

Examples of radical polymerization initiators which can be used in the present invention include, but are not limited to: organic peroxides and azo compounds. Examples of the radical polymerization initiator are given below.

Illustrative examples of organic peroxides include, but are not limited to: ketone peroxides such as cyclohexanone peroxide, 3,3,5-trimethylcyclohexanone peroxide, and methylcyclohexanone peroxide; peroxyketals such as 1,1-bis(t-butylperoxy)cyclohexane and n-butyl-4,4-bis(t-butylperoxy)valerate; dialkylperoxides such as cumene hydroperoxide, diisopropylbenzene peroxide, 2,5-dimethylhexane-2,5-dihydroperoxide, t-butylcumyl peroxide, α,α-bis(t-butylperoxy-m-isopropyl)benzene, 2,5-dimethyl-2,5-di(t-butylperoxy-m-isopropyl)benzene, and 2,5-dimethyl-2,5-di(t-butylperoxy)hexin-3; diacyl peroxides such as decanoyl peroxide, lauroyl peroxide, benzoyl peroxide, and 2,4-dichlorobenzoyl peroxide; peroxycarbonates such as bis(t-butylcyclohexyl)peroxydicarbonate; peroxyesters such as t-butyl peroxybenzoate and 2,5-dimethyl-2,5-di(benzoylperoxy)hexane; and the like.

Illustrative examples of azo compounds that can be used in the present invention as the free radical initiator include, but are not limited to: methyl azobisisovalerate, 2,2-azobis (isobutylonitrile), 2,2-azobis(2,4-dimethylvaleronitrile), 2,2-azobis(4-methoxy-2,4-dimethylvaleronitrile), dimethyl-2,2-azobisisobutyrate, 4,4-azobis(4-cyanopentanoic acid), azobiscyclohexanecarbonitrile, 2,2-azobispropionitrile, 2,2-azobis(2-methylbutyronitrile), 1,1-azobis(cyclohexane-1-carbonitrile), and the like.

Other free radical initiators that can be employed in the present invention include those mentioned at Cols. 5–7 of U.S. Pat. No. 6,303,265. The entire content of the '265 patent is incorporated herein by reference.

The polymerization initiators may be used either individually or in combination of two or more. In the present invention, it is preferable to add the total necessary amount of the radical polymerization initiator to the monomer which is added successively. In particular, the polymerization initiator is preferably added to monomer B.

In a preferable polymerization method in the present invention, monomer A and the solvent are placed in a reaction vessel and maintained at a specific temperature which enables copolymerization while stirring. The copolymerization temperature is usually 50–150° C., and preferably 80–120° C.

The amount of free radical initiator used in the present invention must be capable of initiating a free radical polymerization reaction amongst the monomers. Typically, the amount of free radical initiator employed in the present invention is from about 1 to about 10 wt %, this wt % being based on the total amount of monomers present in the reaction.

The solvent containing the polymerization initiator and monomer A or, preferably B is successively added to this reaction vessel to allow the monomers to be copolymerized. The solvent containing the polymerization initiator and monomer A, or preferably B may be continuously added in a specific amount or in different amounts, or intermittently added in a specific amount or in different amounts. The amount of the solvent containing monomer A, or preferably B to be added may be increased or decreased stepwise.

In the present invention, the solvent containing monomer B is preferably added to monomer A continuously in a specific amount. Provided that the entire feed amount of the solvent containing monomer B and the initiator is a (g), the rate of addition of the solvent is preferably 0.0005α–0.05α (g/min.). If the rate of addition is within this range, the feed amount of each monomer approximately equals the composition of each monomer in the copolymer. After the addition of the solvent containing monomer B, the mixture is stirred for a specific period of time. The total reaction time is usually 1–48 hours, and preferably 1–24 hours.

The copolymer after polymerization may, or may not, have a small level of impurities such as halogen and metals as well as residual monomers and oligomer components, such as 0.1 wt % or less when measured by HPLC. Reducing the impurity level not only further improves sensitivity, resolution, process stability, pattern shape, and the like as a resist, but also enables provision of a resist having no foreign matter in the solution and showing no change in sensitivity over time. Illustrative purification methods for the copolymers of the present invention include: A method for removing impurities such as metals, a method of allowing metals in the resin solution to be adsorbed using a zeta-potential filter, a method of sequestering metals in a chelate state by washing the resin solution with an acidic aqueous solution such as oxalic acid or sulfonic acid and removing the metals, and the like can be given. As a method for removing the residual monomers and oligomer components at a specific value or less, a liquid-liquid extraction method in which the residual monomers and oligomer components are removed by combining washing with water and a suitable solvent, a purification method in a liquid state such as ultrafiltration in which only the monomers and oligomer components having a specific molecular weight or less are extracted and removed, a reprecipitation method in which the residual monomers and the like are removed by adding the resin solution to a poor solvent dropwise, thereby causing the resin solution to coagulate in the poor solvent, and a purification method in a solid state in which the resin slurry separated by filtration is washed with a poor solvent can be given. These methods may be used in combination.

As the poor solvent used in the reprecipitation method, in the case where monomer A is a monomer shown by the above formula (1) and monomer B is a monomer shown by the above formula (2), lower alcohols, hydrocarbon solvents, ester-type solvents, and water are preferable, although this depends upon the composition and properties of the resin to be purified and the like. For example, methanol, ethanol, 2-propanol, n-hexane, n-heptane, ethyl acetate, butyl acetate, water, and the like can be given.

The polystyrene-reduced weight average molecular weight (hereinafter referred to as Mw) of the purified copolymer determined by gel permeation chromatography (GPC) is usually 1,000–300,000, preferably 2,000–200,000, and still more preferably 3,000–100,000. If the Mw of the copolymer is less than 1,000, heat resistance as a resist may be decreased. If the Mw exceeds 300,000, developability as a resist may be decreased.

The ratio of the Mw to the polystyrene-reduced number average molecular weight (hereinafter called Mn) (Mw/Mn) determined by GPC of the copolymer is usually 1–5, and preferably 1–3.

It should be noted that the copolymers of the present invention may be formulated using well-known methods, including mixing and blending, into a radiation-sensitive resist composition. The resist composition includes at least the inventive copolymer plus any number of other conventional photoresist components including, for example, a photoacid generator, as described in U.S. Pat. No. 6,177,228 to Allen, et al., the entire content of the '228 patent is incorporated herein by reference.

Embodiments of the present invention are described below in detail by examples. In the examples, part(s) refers to part(s) by weight unless otherwise indicated.

Measurements and evaluation in the examples were carried out as follows. Mw was measured by gel permeation chromatography (GPC) using GPC columns (manufactured by Tosoh Corp., G2000HXL×2, G3000HXL×1, G4000HXL×1) under the following conditions. Flow rate: 1.0 ml/min., eluate: tetrahydrofuran, column temperature: 40° C., standard reference material: monodispersed polystyrene.

The following examples are provided to illustrate the method of the present invention as well as some of the properties of the copolymers achieved therefrom. In Examples 1–6 the following monomer description is provided:

Norbornene hexafluoroalcohol (NB-HFA, i.e., 5-(2, 2ditrifluoromethyl-2-hydroxyethyl)bicyclo[2.2.1]hept-2-ene)—which is shown in formula α-1 was prepared by a Diels-Alder reaction of 1,1-bis(trifluoromethyl)-3-butenol with cyclopentadiene at a high temperature and a high pressure in an argon atmosphere.

Norbornene spirolactone (SL-5M, i.e., Spiro[bicyclo [2.2.1]hept-5-ene-2,3'(2H)-furan]-5'-one) having the following formula:

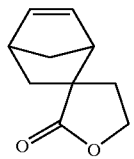

I may be prepared by Diels-Alder reaction of α-methylene-β-butyrolactone with cyclopentadiene, as described by Fotiadu et al., Tetrahedron Letters, 1990, 31, 4863–4866, or alternately as a mixture of isomers in procedures described by Hasloin et al., Tetrahedron Letters, 1976, 4651, and Kayser et al., Can. J. Chem. 1978, 56, 1524.

Methyl tetracyclododecenecarboxylate (tetracyclo [$6.2.1.1^{3,6}.0^{2,7}$]dodec-4-ene-9-carboxylic acid, methyl ester)—which is shown by the following formula:

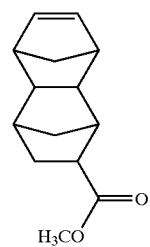

II was prepared by a Diels-Alder reaction of methyl acrylate with cyclopentadiene at a high temperature and a high pressure in an argon atmosphere.

Norbornene MCP ester (NB-MCP; i.e., bicyclo[2.2.1] hept-2-ene-5-carboxylic acid, (1-methyl-1-cyclopentyl) ester) which is shown by the following formula:

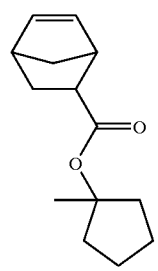

III was prepared by Diels-Alder reaction of 2-methyl-2-cyclopentyl acrylate with cyclopentadiene.

2-Ethyl-2-cyclohexyl acrylate (ECHA, i.e., acrylic acid, 1-ethylcyclohexyl ester) and 2-Ethyl-2-norbornyl acrylate (ENBA, i.e., acrylic acid, 2-ethylbicyclo[2.2.1]hept-2-yl ester)—which are shown in the following formulas:

IV

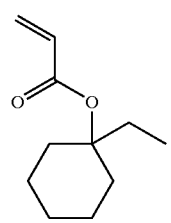

ECHA

V

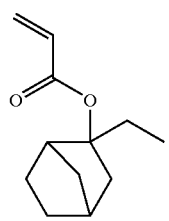

ENBA were prepared by condensation of 1-ethyl-1-cyclohexanol (ECHA) or 2-ethyl-2-norbornanol (ENBA) and acryloyl chloride in the presence of triethylamine. The corresponding alcohols are obtained by addition of ethylmagnesium bromide to cyclohexanone (for ECHA) or norcamphor (for ENBA). A general method of preparation for monomers such as ECHA and ENBA is provided in Nozaki et al., Journal of Photopolymer Science and Technology, 1997, 10, 545.

2-Methyl-2-adamantyl acrylate—which is shown in formula β-4 was purchased from Osaka Organic Chemical Ind., Ltd. and was used as is.

2-(3-Hydroxyadamant-1-yl) acrylate—which is shown in formula β-3 was purchased from Idemitsu Petrochemical Co, Ltd. and was used as is.

5-Acryloxy-2,6-norbomanecarbolactone—which is shown in formula β-2 was purchased from DAICEL Chemical Industries, Ltd. and was used as is.

All other materials are common and should require no additional identification, including, for example, 2,2'-Azobis(isobutyronitrile) (AIBN) and t-Butylperoxy isopropyl carbonate (TBPIC).

EXAMPLE 1

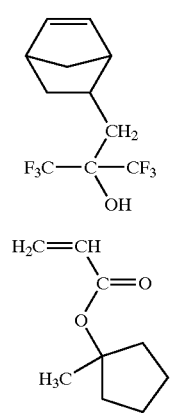

(α-1)

(β-1)

(β-2)

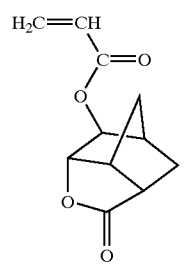

(β-3)

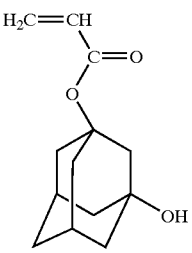

A solution in which 14.02 g (20 mol %) of a compound (β-1), 28.39 g (30 mol %) of a compound (β-2), 20.21 g (20 mol %) of a compound (β-3) were dissolved in 62.61 g of 2-butanone, in which 8.32 g of methyl azobisisovalerate was further dissolved, was prepared in a dropping funnel. A 500 ml three neck flask was charged with 37.39 g (30 mol %) of a compound (β-1) and 37.39 g of 2-butanone and purged with nitrogen for 30 minutes. After purging with nitrogen, the mixture in the flask was maintained at 80° C. while stirring. The monomer solution of the compounds (β-1), (β-2), and (β-3) in the dripping funnel was added dropwise to the flask at a rate of 1.11 g/min., and the monomers were polymerized for three hours while heating. After polymerization, the polymer solution was cooled with water to 30° C. or less. The cooled polymer solution was placed in a 1000 ml separating funnel. After the addition of 200 g of ethyl acetate, 150 g of methanol, and 200 g of water, the mixture was stirred for five minutes and then allowed to stand for one hour. Then, 250 g of the lower layer of the mixture was removed. The solvent of the lower layer resin solution was replaced with a propylene glycol monomethyl ether acetate solution using an evaporator to obtain 200 g of a resin solution at a concentration of 41 wt % (82 g, yield 82 wt %). This acid-dissociable-group-containing resin was a copolymer with an Mw of 6,500 in which the content of recurring units derived from the compounds (α-1), (β-1), (β-2), and (β-3) was 27.1/20.2/31.6/21.1 (mol %). The copolymerization results are shown in Table 1.

EXAMPLE 2

(α-1)

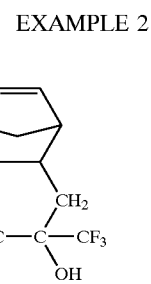

-continued

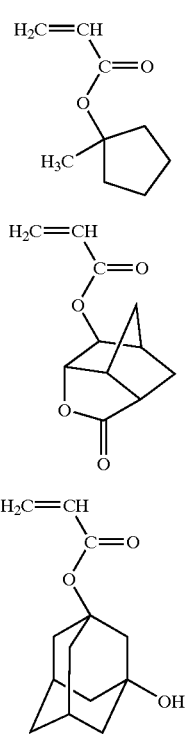

(β-1)

(β-2)

(β-3)

A solution in which 14.02 g (20 mol %) of a compound (β-1), 28.39 g (30 mol %) of a compound (β-2), 20.21 g (20 mol %) of a compound (β-3) were dissolved in 62.61 g of 2-butanone, in which 6.34 g of t-butylperoxyisopropyl carbonate was further dissolved, was prepared in a dropping funnel. A 500 ml three neck flask was charged with 37.39 g (30 mol %) of a compound (α-1) and 37.39 g of 2-butanone, and purged with nitrogen for 30 minutes. After purging with nitrogen, the mixture in the flask was maintained at 80° C. while stirring. The monomer solution of the compounds (β-1), (β-2), and (β-3) in the dripping funnel was added dropwise to the flask at a rate of 1.10 g/min., and the monomers were polymerized for three hours while heating. After polymerization, the polymer solution was cooled with water to 30° C. or less. The cooled polymer solution was placed in a 1000 ml separating funnel. After the addition of 200 g of ethyl acetate, 150 g of methanol, and 200 g of water, the mixture was stirred for five minutes and then allowed to stand for one hour. Then, 250 g of the lower layer of the mixture was removed. The solvent of the lower layer resin solution was replaced with a propylene glycol monomethyl ether acetate solution using an evaporator to obtain 200 g of a resin solution at a concentration of 43 wt % (86 g, yield 86 wt %). This acid-dissociable-group-containing resin was a copolymer with an Mw of 9,200 in which the content of recurring units derived from the compounds (α-1), (β-1), (β-2), and (β-3) was 29.4/20.2/30.4/20.0 (mol %). The copolymerization results are shown in Table 1.

EXAMPLE 3

(α-2)

-continued (β-4)

(β-2)

(β-5)

A solution in which 40.34 g (30 mol %) of a compound (β-4), 38.09 g (30 mol %) of a compound (β-2), 4.39 g (10 mol %) of a compound (β-5) were dissolved in 82.78 g of 2-butanone, in which 8.50 g of t-butylperoxyisopropyl carbonate was further dissolved, was prepared in a dropping funnel. A 500 ml three neck flask was charged with 17.22 g (30 mol %) of a compound (β-2) and 17.22 g of 2-butanone and purged with nitrogen for 30 minutes. After purging with nitrogen, the mixture in the flask was maintained at 80° C. while stirring. The monomer solution of the compounds (β-4), (β-2), and (β-5) in the dripping funnel was added dropwise to the flask at a rate of 1.45 g/min., and the monomers were polymerized for two hours while heating. After polymerization, the polymer solution was cooled with water to 30° C. or less, diluted with 200 g of 2-butanone, and poured into 2,000 g of methanol. The precipitated white powder was separated by filtration. The white powder was washed with 400 g of methanol twice and separated by filtration. The separated powder was dried at 50° C. for 17 hours to obtain 76 g of a white powder resin (yield 76 wt %). This acid-dissociable-group-containing resin was a copolymer with an Mw of 9,400 in which the content of recurring units derived from the compounds (β-2), (β-4), (β-2), and (β-5) was 29.4/30.1/30.2/10.3 (mol %). The copolymerization results are shown in Table 1.

EXAMPLE 4

(α-1)

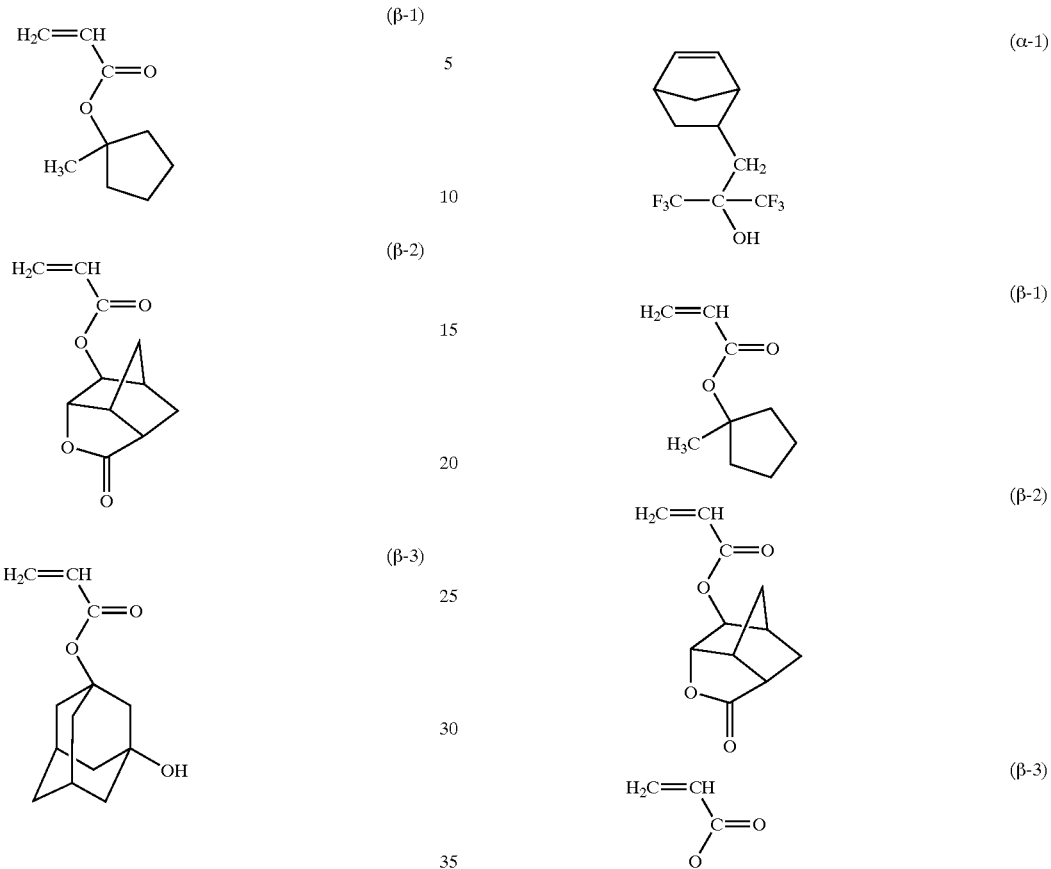

(β-1)

(β-2)

(β-3)

A 500 ml three neck flask was charged with a solution in which 67.59 g (60 mol %) of a compound (α-1), 6.97 g (11 mol %) of a compound (β-1), 15.40 g (18 mol %) of a compound (β-2), and 10.05 g (11 mol %) of a compound (β-3) were dissolved in 100.0 g of 2-butanone, in which 7.56 g of methyl azobisisovalerate was further dissolved, and purged with nitrogen for 30 minutes. After purging with nitrogen, the mixture in the flask was maintained at 80° C. while stirring and polymerized for five hours while heating. After polymerization, the polymer solution was cooled with water to 30° C. or less. The cooled polymer solution was placed in a 1000 ml separating funnel. After the addition of 200 g of ethyl acetate, 150 g of methanol, and 200 g of water, the mixture was stirred for five minutes and then allowed to stand for one hour. Then, 250 g of the lower layer of the mixture was removed. The solvent of the lower layer resin solution was replaced with a propylene glycol monomethyl ether acetate solution using an evaporator to obtain 100 g of a resin solution at a concentration of 43 wt % (43 g, yield 43 wt %). This acid-dissociable-group-containing resin was a copolymer with an Mw of 8,200 in which the content of recurring units derived from the compounds (α-1), (β-1), (β-2), and (β-3) was 26.2/21.4/32.1/20.3 (mol %). The copolymerization results are shown in Table 1.

EXAMPLE 5

A 500 ml three neck flask was charged with a solution in which 67.59 g (60 mol %) of a compound (α-1), 6.97 g (11 mol %) of a compound (β-1), 15.40 g (18 mol %) of a compound (β-2) and 10.05 g (11 mol %) of a compound (β-3) were dissolved in 100.0 g of 2-butanone, in which 5.76 g of t-butylperoxyisopropyl carbonate was further dissolved, and purged with nitrogen for 30 minutes. After purging with nitrogen, the mixture in the flask was maintained at 80° C. while stirring and polymerized for five hours while heating. After polymerization, the polymer solution was cooled with water to 30° C. or less. The cooled polymer solution was placed in a 1000 ml separating funnel. After the addition of 200 g of ethyl acetate, 150 g of methanol, and 200 g of water, the mixture was stirred for five minutes and then allowed to stand for one hour. Then, 250 g of the lower layer of the mixture was removed. The solvent of the lower layer resin solution was replaced with a propylene glycol monomethyl ether acetate solution using an evaporator to obtain 100 g of a resin solution at a concentration of 48 wt % (48 g, yield 48 wt %). This acid-dissociable-group-containing resin was a copolymer with an Mw of 9,800 in which the content of recurring units derived from the compounds (α-1), (β-1), (β-2), and (β-3) was 28.4/20.7/30.6/20.3 (mol %). The copolymerization results are shown in Table 1.

EXAMPLE 6

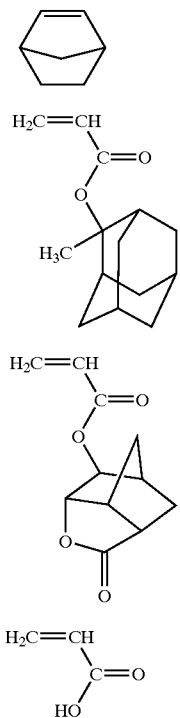

A 500 ml three neck flask was charged with a solution in which 42.26 g (60 mol %) of a compound (α-2), 28.02 g (17 mol %) of a compound (β-4), 26.48 g (17 mol %) of a compound (β-2), and 3.23 g (6 mol %) of a compound (β-5) were dissolved in 100.0 g of 2-butanone, in which 10.43 g of t-butylperoxyisopropyl carbonate was further dissolved, and purged with nitrogen for 30 minutes. After purging with nitrogen, the mixture in the flask was maintained at 80° C. while stirring and polymerized for five hours while heating. After polymerization, the polymer solution was cooled with water to 30° C. or less, diluted with 200 g of 2-butanone, and poured into 2,000 g of methanol. The precipitated white powder was separated by filtration. The white powder was washed with 400 g of methanol twice and separated by filtration. The separated product was dried at 50° C. for 17 hours to obtain 47 g of a white powder resin (yield 47 wt %). This acid-dissociable-group-containing resin was a copolymer with an Mw of 10,200 in which the content of recurring units derived from the compounds (α-2), (β-4), (β-2), and (β-5) was 28.3/29.8/31.2/10.7 (mol %). The copolymerization results are shown in Table 1.

EXAMPLE 7

Synthesis of Poly(isobornyl Acrylate-co-acrylonitrile)

A thick-walled glass reaction tube equipped with a teflon-coated stirbar and a teflon stopcock was charged with 4.90 g of an equimolar mixture of isobornyl acrylate and acrylonitrile (37.5 mmol acrylics), 7.35 g isopropyl alcohol, and 0.123 g 2,2'-azobis(isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration; washed with more methanol, re-suspended in an additional 150 mL methyl alcohol, stirred vigorously for several hours, then re-filtered and dried in vacuum at 65° C. for 60 h. The recovered polymer weighed 3.573 g. Analysis of the polymerization mixture by $^1$H NMR before and after heating revealed greater than 95% consumption of both isobornyl acrylate and acrylonitrile. Analysis of the copolymer by gel-permeation chromatography revealed a monomodal distribution of molecular weights with $M_W$=10,700 and $M_N$=5,800. Analysis of the copolymer by modulated differential scanning calorimetry (MDSC) gave a clearly defined glass transition temperature ($T_g$) centered at 94° C.

EXAMPLE 8

Synthesis of Poly(isobornyl Acrylate-co-acrylonitrile-co-norbornene)

A thick-walled glass reaction tube equipped with a teflon-coated stirbar and a teflon stopcock was charged with 1.77 g norbornene (18.75 mmol), 4.90 g of an equimolar mixture of isobornyl acrylate and acrylonitrile (37.5 mmol acrylics), 6.04 g isopropyl alcohol, and 0.139 g 2,2'-azobis(isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.758 g. Analysis of the polymerization mixture by $^1$H NMR before and after heating revealed approximately 61% consumption of both isobornyl acrylate and acrylonitrile and 34% consumption of norbornene. Analysis of the copolymer by gel-permeation chromatography revealed a monomodal distribution of molecular weights with $M_W$=7,100 and $M_N$=4,700. Analysis of the copolymer by modulated differential scanning calorimetry (MDSC) gave a clearly defined glass transition temperature ($T_g$) centered at 134° C., and showed no detectable thermal transition at 94° C.

EXAMPLE 9

Synthesis of Poly(isobornyl Acrylate-co-acrylonitrile-co-norbornene)

A thick-walled glass reaction tube equipped with a teflon-coated stirbar and a teflon stopcock was charged with 3.53 g norbornene (37.5 mmol), 4.90 g of an equimolar mixture of isobornyl acrylate and acrylonitrile (37.5 mmol acrylics), 4.70 g isopropyl alcohol, and 0.154 g 2,2'-azobis(isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 1.334 g. Analysis of the polymerization mixture by $^1$H NMR before and after heating revealed approximately 30% consumption of both isobornyl acrylate and acrylonitrile and 14% consumption of norbornene. Analysis of the copolymer by gel-permeation chromatography revealed a monomodal distribution of molecular weights with $M_W$=8,500 and $M_N$=6,100. Analysis of the copolymer by modulated differential scanning calorimetry (MDSC) gave a clearly defined glass transition temperature ($T_g$) centered at 147° C., and showed no detectable thermal transition at 94° C.

EXAMPLE 10

Synthesis of Poly(isobornyl Acrylate-co-acrylonitrile-co-norbornene)

A thick-walled glass reaction tube equipped with a teflon-coated stirbar and a teflon stopcock was charged with 5.30 g norbornene (56.25 mmol), 4.90 g of an equimolar mixture of isobornyl acrylate and acrylonitrile (37.5 mmol acrylics), 3.38 g isopropyl alcohol, and 0.170 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 1.589 g. Analysis of the polymerization mixture by $^1$H NMR before and after heating revealed approximately 31% consumption of both isobornyl acrylate and acrylonitrile and 7.4% consumption of norbornene. Analysis of the copolymer by gel-permeation chromatography revealed a monomodal distribution of molecular weights with $M_W$=8,700 and $M_N$=6,000. Analysis of the copolymer by modulated differential scanning calorimnetry (MDSC) gave a clearly defined glass transition temperature ($T_g$) centered at 155° C., and showed no detectable thermal transition at 94° C.

EXAMPLE 11

Synthesis of Poly(isobornyl Acrylate-co-acrylonitrile-co-norbornene)

A thick-walled glass reaction tube equipped with a teflon-coated stirbar and a teflon stopcock was charged with 7.06 g norbornene (75 mmol), 4.90 g of an equimolar mixture of isobornyl acrylate and acrylonitrile (37.5 mmol acrylics), 2.06 g isopropyl alcohol, and 0.185 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 1.596 g. Analysis of the polymerization mixture by $^1$H NMR before and after heating revealed approximately 30% consumption of both isobornyl acrylate and acrylonitrile and 7.5% consumption of norbornene. Analysis of the copolymer by gel-permeation chromatography revealed a monomodal distribution of molecular weights with Mw 8,400 and MN 5,700. Analysis of the copolymer by modulated differential scanning calorimetry (MDSC) gave a clearly defined glass transition temperature ($T_g$) centered at 158° C., and showed no detectable thermal transition at 94° C.

EXAMPLE 12

Synthesis of Poly(isobornyl Acrylate-co-norbornene)

A thick-walled glass reaction tube equipped with a teflon-coated stirbar and a teflon stopcock was charged with 3.00 g norbornene (32 mmol), 6.63 g of isobornyl acrylate (32 mmol), 9.6 g isopropyl alcohol, and 0.131 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 7.04 g. Analysis of the polymerization mixture by $^1$H NMR before and after heating revealed greater than 95% consumption of isobornyl acrylate and 31% consumption of norbornene. Analysis of the copolymer by gel-permeation chromatography revealed a monomodal distribution of molecular weights with $M_W$=13, 800 and $M_N$=5,800. Analysis of the copolymer by modulated differential scanning calorimetry (MDSC) gave a clearly defined glass transition temperature ($T_g$) centered at 157° C., and showed no other detectable thermal transitions.

EXAMPLE 13

Synthesis of Poly(isobornyl Acrylate-co-"norbornene Hexafluoroalcohol" (NB-HFA))

A thick-walled glass reaction tube equipped with a teflon-coated stirbar and a teflon stopcock was charged with 3.95 g NB-HFA (14.4 mmol), 3.00 g of isobornyl acrylate (14.4 mmol), 4.0 g isopropyl alcohol, and 0.057 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.845 g. Analysis of the polymerization mixture by $^1$H NMR before and after heating revealed approximately 72% consumption of isobornyl acrylate and 32% consumption of NB-HFA. Analysis of the copolymer by gel-permeation chromatography revealed a monomodal distribution of molecular weights with $M_W$=20,000 and $M_N$=11,800. Analysis of the copolymer by modulated differential scanning calorimetry (MDSC) gave a clearly defined glass transition temperature ($T_g$) centered at 169° C., and showed no other detectable thermal transitions.

EXAMPLE 14

Synthesis of Poly(isobornyl Acrylate-co-"norbornene Spirolactone" (SL-5M)).

A thick-walled glass reaction tube equipped with a teflon-coated stirbar and a teflon stopcock was charged with 3.28 g SL-SM (20 mmol), 4.16 g of isobornyl acrylate (20 mmol), 5.0 g isopropyl alcohol, and 0.085 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 3.173 g. Analysis of the polymerization mixture by $^1$H NMR before and after heating revealed approximately 73% consumption of isobornyl acrylate and 32% consumption of SL-5M. Analysis of the copolymer by gel-permeation chromatography revealed a monomodal distribution of molecular weights with $M_W$=22,800 and $M_N$=12,900. Analysis of the copolymer by modulated differential scanning calorimetry (MDSC) gave a clearly defined glass transition temperature ($T_g$) centered at 158° C., and showed no other detectable thermal transitions.

EXAMPLE 15

Synthesis of Poly(isobornyl Acrylate-co-"methyl tetracyclododecenecarboxylate" (M-TCD)

A thick-walled glass reaction tube equipped with a teflon-coated stirbar and a teflon stopcock was charged with 4.36 g M-TCD (20 mmol), 4.16 g of isobornyl acrylate (20 mmol), 5.0 g isopropyl alcohol, and 0.085 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 15 h The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 3.173 g. Analysis of the polymerization mixture by $^1$H NMR before and after heating revealed approximately 58% consumption of isobornyl acrylate and 16% consumption of M-TCD. Analysis of the copolymer by gel-permeation chromatography revealed a monomodal distribution of molecular weights with $M_W$=14,200 and $M_N$=8,800. Analysis of the copolymer by modulated differential scanning calorimetry (MDSC) gave a clearly defined glass transition temperature ($T_g$). Centered at 177° C., and showed no other detectable thermal transitions.

EXAMPLE 16

Synthesis of Poly(isobomyl Acrylate-co-"norbornene Spirolactone" (SL-5M))

A thick-walled glass reaction tube equipped with a teflon-coated stirbar and a teflon stopcock was charged with 5.00 g SL-5M (30.4 mmol), 3.165 g of isobomyl acrylate (15.2 mmol), 3.835 g isopropyl alcohol, and 0.089 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 60° C. for 65 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 3.168 g. Analysis of the polymerization mixture by $^1$H NMR before and after heating revealed approximately 85% consumption of isobomyl acrylate and 15% consumption of SL-5M. Analysis of the copolymer by gel-permeation chromatography revealed a monomodal distribution of molecular weights with $M_W$=21,100 and $M_N$=11,800. Analysis of the copolymer by modulated differential scanning calorimetry (MDSC) gave a clearly defined glass transition temperature ($T_g$) centered at 196° C., and showed no other detectable thermal transitions.

EXAMPLE 17

Synthesis of Poly(isobomyl Acrylate-co-"norbornene Spirolactone" (SL-5M)).

A thick-walled glass reaction-tube equipped with a teflon-coated stirbar and a teflon stopcock was charged with 5.00 g SL-5M (30.4 mmol), 3.165 g of isobomyl acrylate (15.2 mmol), 3.835 g isopropyl alcohol, and 0.089 g 2,2'-azobis (isobutyronitrile) (AIBN). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 80° C. for 16 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 3.009 g. Analysis of the polymerization mixture by $^1$H NMR before and after heating revealed approximately 89% consumption of isobornyl acrylate and 19% consumption of SL-5M. Analysis of the copolymer by gel-permeation chromatography revealed a monomodal distribution of molecular weights with $M_W$=14,200 and $M_N$=7,400. Analysis of the copolymer by modulated differential scanning calorimetry (MDSC) gave a clearly defined glass transition temperature ($T_g$) centered at 192° C., and showed no other detectable thermal transitions.

EXAMPLE 18

Synthesis of poly(isobornyl acrylate-co-"norbornene Spirolactone" (SL-5M))

A thick-walled glass reaction tube equipped with a teflon-coated stirbar and a teflon stopcock was charged with 5.00 g SL-SM (30.4 mmol), 3.165 g of isobornyl acrylate (15.2 mmol), 4.835 g 2-butyl alcohol, and 0.095 g t-butylperoxyisopropyl carbonate (TBPIC). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 100° C. for 20 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.628 g. Analysis of the polymerization mixture by $^1$H NMR before and after heating revealed approximately 83% consumption of isobornyl acrylate and 17% consumption of SL-5M. Analysis of the copolymer by gel-permeation chromatography revealed a monomodal distribution of molecular weights with $M_W$=9,800 and $M_N$=5,900. Analysis of the copolymer by modulated differential scanning calorimetry (MDSC) gave a clearly defined glass transition temperature ($T_g$) centered at 189° C., and showed no other detectable thermal transitions.

EXAMPLE 19

Synthesis of Poly(isobomyl Acrylate-co-"norbornene Spirolactone" (SL-5M)).

A thick-walled glass reaction tube equipped with a teflon-coated stirbar and a teflon stopcock was charged with 4.90 g SL-5M (30 mmol), 3.103 g of isobomyl acrylate (15 mmol), 6.0 g 2-butyl alcohol, and 0.110 g t-butylperoxyisopropyl carbonate (TBPIC). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 105° C. for 24 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.82 g. Analysis of the polymerization mixture by $^1$H NMR before and after heating revealed approximately 92% consumption of isobomyl acrylate and 17% consumption of SL-5M. Analysis of the copolymer by gel-permeation chromatography revealed a monomodal distribution of molecular weights with $M_W$=7,900 and $M_N$=4,700. Analysis of the copolymer by modulated differential scanning calorimetry (MDSC) gave a clearly defined glass transition temperature ($T_g$) centered at 190° C., and showed no other detectable thermal transitions.

EXAMPLE 20

Synthesis of Poly(isobomyl Acrylate-co-"norbornene Spirolactone" (SL-5M))

A thick-walled glass reaction tube equipped with a teflon-coated stirbar and a teflon stopcock was charged with 4.90 g SL-5M (30 mmol), 3.103 g of isobomyl acrylate (15 mmol), 4.0 g 2-butyl alcohol, 2.38 g 2-pentyl alcohol, and 0.110 g t-butylperoxyisopropyl carbonate (TBPIC). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 110° C. for 24 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.80 g. Analysis of the polymerization mixture by $^1$H NMR before and after heating revealed greater than 95% consumption of isobomyl acrylate and 16% consumption of SL-5M. Analysis of the copolymer by gel-permeation chromatography revealed a monomodal distribution of molecular weights with $M_W$=7,400 and $M_N$=4,500. Analysis of the copolymer by modulated differential scanning calorimetry (MDSC) gave a clearly defined glass transition temperature ($T_g$) centered at 190° C., and showed no other detectable thermal transitions.

EXAMPLE 21

Synthesis of Poly(isobomyl Acrylate-co-"norbornene Spirolactone" (SL-5M))

A thick-walled glass reaction tube equipped with a teflon-coated stirbar and a teflon stopcock was charged with 4.90 g SL-5M (30 mmol), 3.103 g of isobornyl acrylate (15 mmol), 2.0 g 2-butyl alcohol, 4.76 g 2-pentyl alcohol, and 0.110 g t-butylperoxyisopropyl carbonate (TBPIC). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 115° C. for 24 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.68 g. Analysis of the polymerization mixture by $^1$H NMR before and after heating revealed greater than 95% consumption of isobornyl acrylate and 19% consumption of SL-5M. Analysis of the copolymer by gel-permeation chromatography revealed a monomodal distribution of molecular weights with $M_W$=6,700 and $M_N$=4,300. Analysis of the copolymer by modulated differential scanning calorimetry (MDSC) gave a clearly defined glass transition temperature ($T_g$) centered at 191° C., and showed no other detectable thermal transitions.

EXAMPLE 22

Synthesis of Poly(isobomyl Acrylate-co-"norbornene Spirolactone" (SL-5M))

A thick-walled glass reaction tube equipped with a teflon-coated stirbar and a teflon stopcock was charged with 5.0 g SL-5M (30.4 mmol), 3.165 g of isobomyl acrylate (15.2 mmol), 7.835 g 2-pentyl alcohol, and 0.095 g t-butylperoxyisopropyl carbonate (TBPIC). The tube was deoxygenated by a fourfold repetition of freezing the contents in liquid nitrogen, evacuation of residual gases under vacuum, re-sealing the tube, and thawing of the contents. Following deoxygenation, the tube was immersed in a thermostatted oil bath and heated at 120° C. for 24 h. The resulting mixture was cooled and poured slowly into 150 mL methyl alcohol. The precipitated polymer was collected by filtration, washed with more methanol, re-suspended in an additional 150 mL methyl alcohol, stirred vigorously for several hours, then re-filtered and dried in vacuum at 65° C. for 60 h. The recovered polymer weighed 2.59 g. Analysis of the polymerization mixture by $^1$H NMR before and after heating revealed greater than 95% consumption of isobomyl acrylate and 25% consumption of SL-5M. Analysis of the copolymer by gel-permeation chromatography revealed a monomodal distribution of molecular weights with $M_W$=6,100 and $M_N$=4,000. Analysis of the copolymer by modulated differential scanning calorimetry (MDSC) gave a clearly defined glass transition temperature ($T_g$) centered at 184° C., and showed no other detectable thermal transitions.

EXAMPLE 23

Synthesis of a Cyclic-olefin-acrylic Copolymer

A 100 mL reaction tube was charged with 8.621 g SL-5M, 2.735 g ECHA, 1.667 g HADA, (β-3), 0.270 g acrylic acid, (β-5), 6.7 g 2-butanol, 4.0 g 2-pentanol, 231 mg TBPIC, and a teflon stir-bar. The mixture was degassed in vacuum with four freeze-pump-thaw cycles. The sealed tube was immersed in an oil bath at 110° C. for 15 h. Following reaction, the mixture was cooled, then precipitated into 150 mL hexanes. The aggregated polymer was washed repeatedly with additional aliquots (100 mL) of hexanes until it broke up into a fine powder. The powder was collected on a filter, air dried, washed twice with ice-cold methanol, collected, and dried in vacuum to yield 4.67 g purified material. Analysis by gel-permeation chromatography (GPC) indicated $M_W$=8,400, and $M_N$=5,200. Analysis by modulated differential scanning calorimetry (MDSC) indicated a glass transition temperature of 165° C.

EXAMPLE 24

Synthesis of a Cyclic-olefin-acrylic Copolymer

A 100 mL reaction tube was charged with 8.210 g SL-SM, 2.429 g ENBA, 1.588 g HADA, (β-3), 0.386 g acrylic acid, (β-5), 6.25 g 2-butanol, 3.72 g 2-pentanol, 220 mg TBPIC and a teflon stir-bar. The mixture was degassed in vacuum with four freeze-pump-thaw cycles. The sealed tube was immersed in a oil bath held at 110° C. for 15 h. Following reaction, the mixture was cooled, then precipitated into 150 mL hexanes. The aggregated polymer was washed repeatedly with additional aliquots (100 mL) of hexanes until it broke up into a fine powder. The powder was collected on a filter, air dried, washed twice with ice-cold methanol, collected, and dried in vacuum to yield 5.02 g purified material. Analysis by gel-permeation chromatography (GPC) indicated $M_W$=6,700 and $M_N$=4,200. Analysis by modulated differential scanning calorimetry (MDSC) indicated a glass transition temperature of 182° C.

EXAMPLE 25

Synthesis of a Cyclic-olefin-acrylic Copolymer

A 100 mL 3-necked round-bottom flask was equipped with a stir bar, and charged with 22.38 g norbornene-MCP ester, 8.33 g NLA, 0.36 g acrylic acid, (β-5), 0.64 g t-butyl acrylate, and 29 g 2-butanol. The mixture was heated to gentle reflux under a nitrogen stream. A 0.881 g aliquot of t-butylperoxyisopropyl carbonate in hydrocarbons stock was added, and the reaction was once again flushed with nitrogen. The reaction was maintained at reflux for 18 h. Upon cooling, approximately 15 g acetone was added to redissolve all polymer. A 43 mL portion of the crude mixture was removed and precipitated into 2.5L of methanol. The precipitated polymer was collected by filtration, washed three times with 75 mL portions of methanol, air dried, then dried in vacuum for 48 h to yield 3.71 g polymer. Analysis by gel-permeation chromatography indicated a weight-average molecular weight of 8800, and a polydispersity index of 1.46. Analysis by modulated differential scanning calorimetry indicated a glass-transition temperature of 184° C.

EXAMPLE 26

Synthesis of a Cyclic-olefin-acrylic Copolymer

A 100 mL 3-necked round-bottom flask was equipped with a stir bar, and charged with 16.07 g norbornene-MCP ester, 8.33 g NLA, (β-2), 0.36 g acrylic acid, (β-5), 0.64 g t-butyl acrylate, and 29 g 2-butanol. The mixture was heated to gentle reflux under a nitrogen stream. A 0.881 g aliquot of t-butylperoxyisopropyl carbonate in hydrocarbons stock was added, and the reaction was once again flushed with nitrogen. Following 30 min of heating at reflux, 10 mL of acetone were added. The reaction was maintained at reflux for 18 h. Upon cooling, approximately 5 g acetone was added to redissolve all polymer. A 43 mL portion of the crude mixture was removed and precipitated into 2L of methanol. The precipitated polymer was collected by filtration, washed three times with 75 mL portions of methanol, air dried, then dried in vacuum for 48 h to yield 3.81 g polymer. Analysis by gel-permeation chromatography indicated a weight-average molecular weight of 8,300, and a polydispersity index of 1.51.

EXAMPLE 27

Copolymer of Norbornene, 5-Acryloxy-2,6-norbomanecarbolactone, 2-Methyl-2-adamantyl acrylate, and Acrylic acid A 250 mL three-neck round-bottom flask was equipped with a magnetic stirrer, temperature-controlled heating mantle, thermocouple thermometer, and Friedrichs condenser with a nitrogen bubbler gas inlet. The flask was charged with: norbornene (24.72 g, 0.262 mol), 5-acryloxy-2,6-norbomanecarbolactone (11.74 g, 0.05623 mol), 2-methyl-2-adamantyl acrylate (12.39 g, 0.05623 mol), acrylic acid (1.35 g, 0.01874 mol), 1-dodecanethiol (1.11 g, 0.00552 mol), 30.8 grams of 2-propanol, and 15.38 grams of gamma-butyrolactone. The mixture was purged with nitrogen, then heated to 79–80° C. with stirring. To the stirred mixture was added tert-butylperoxy isopropyl carbonate (75 wt % in hydrocarbon mixture) (1.297 g, 0.00552 mol), the mixture was nitrogen flushed then maintained at reflux (82–80° C.) for 19 hours. At this point only traces of acrylic monomer could be detected by proton NMR. The heat was removed, the mixture diluted with 35 mL 2-propanol and 10 mL acetone, then allowed to cool to room temperature. The mixture was added dropwise to 7 L of stirred methanol. The precipitated polymer was filtered and washed on the funnel with three 200 mL portions of methanol. The solid was dried overnight in a vacuum oven at 60° C. and an ultimate vacuum of less than 500 milliTorr to obtain 24.13 grams of polymer. The isolated polymer had a Mw of 8.4 k daltons and a polydispersity of 1.79 as determined by GPC versus polystyrene standards. Analysis by modulated differential scanning calorimetry (MDSC) indicated a glass transition temperature of 186° C.

EXAMPLE 28

Copolymer of Norbornene, 5-Norbornene-2-methanol, 5-Acryloxy-2,6-norbomanecarbolactone, 2-Methyl-2-adamantyl Acrylate, and Acrylic Acid A 100 mL three-neck round-bottom flask was equipped with a magnetic stirrer, temperature-controlled heating mantle, thermocouple thermometer, and Friedrichs condenser with a nitrogen bubbler gas inlet. The flask was charged with: norbornene (7.06 g, 0.075 mol), 5-norbornene-2-methanol (3.105 g, 0.025 mol), 5-acryloxy-2,6-norbanecarbolactone (4.46 g, 0.0214 mol), 2-methyl-2-adamantyl acrylate (4.72 g, 0.02142 mol), acrylic acid (0.514 g, 0.00714 mol), 1-dodecanethiol (0.424 g, 0.002095 mol), 11.05 grams of 2-propanol, and 5.524 grams of gamma-butyrolactone. The mixture was purged with nitrogen, then heated to 79–80° C. with stirring. To the stirred mixture was added tertbutylperoxy isopropyl carbonate (75 wt % in hydrocarbon mixture) (0.494 g, 0.0021 mol), the mixture was nitrogen flushed then maintained at reflux (82–80° C.) for 19 hours. At this point only traces of acrylic monomer could be detected by proton NMR. The heat was removed, the mixture diluted with 10 mL acetone, then allowed to cool to room temperature. The mixture was added dropwise to 2.5 L of stirred methanol. The precipitated polymer was filtered and washed on the funnel with three 100 mL portions of methanol. The solid was dried overnight in a vacuum oven at 60° C. and an ultimate vacuum of less than 500 milliTorr to obtain 9.01 grams of polymer. The isolated polymer had a Mw of 8.8 k daltons and a polydispersity of 1.71 as determined by GPC versus polystyrene standards.

DISCUSSION OF EXAMPLES

Examples 1–6 show the efficacy of the inventive method using different monomers and different addition schemes.

incorporation (approximately 30 mole %) and glass-transition temperature enhancement (approximately 70° C. relative to the pure acrylic copolymer) are observed under these conditions. Acrylonitrile limits the acrylic conversion and polymer yield in these cases, but this is not material to the invention. The sole figure of the present application shows the differential scanning calorimetry data for Examples 7–11. Complex Cp in the figure refers to heat capacity.

Examples 12–16 illustrate the generality of the copolymerization with regard to choice of cyclic olefin monomer.

Examples 17–22 illustrate that the copolymerization reaction may be carried out under a variety of free radical polymerization conditions yielding reproducible polymer compositions.

Examples 23–28 illustrate selected copolymerization of cyclic olefins with acrylics that yield resist-like copolymers.

While the present invention has been shown and described with respect to preferred embodiments thereof, it will be understood by those skilled in the art that the foregoing and other changes in forms and details may be made without departing from the spirit and scope of the present invention. It is therefore intended that the present invention is not limited to exact forms and details described and illustrated, but fall within the scope of the appended claims.

TABLE 1

| Example | α-1 Feed amount | α-1 Content* | α-2 Feed amount | α-2 Content* | β-1 Feed amount | β-1 Content* | β-2 Feed amount | β-2 Content* | β-3 Feed amount | β-3 Content* | β-4 Feed amount | β-4 Content* | β-5 Feed amount | β-5 Content* | Yield (wt %) |
|---|---|---|---|---|---|---|---|---|---|---|---|---|---|---|---|
| 1 | 30.0 | 27.1 | — | — | 20.0 | 20.2 | 30.0 | 31.6 | 20.0 | 21.1 | — | — | — | — | 82 |
| 2 | 30.0 | 29.4 | — | — | 20.0 | 20.2 | 30.0 | 30.4 | 20.0 | 20.0 | — | — | — | — | 86 |
| 3 | — | — | 30.0 | 29.4 | — | — | 30.0 | 30.2 | — | — | 30.0 | 30.1 | 10.0 | 10.3 | 76 |
| 4 | 60.0 | 26.2 | — | — | 11.0 | 21.4 | 18.0 | 32.1 | 11.0 | 20.3 | — | — | — | — | 43 |
| 5 | 60.0 | 28.4 | — | — | 11.0 | 20.7 | 18.0 | 30.8 | 11.0 | 20.3 | — | — | — | — | 48 |
| 6 | — | — | 60.0 | 28.3 | — | — | 17.0 | 31.2 | — | — | 17.0 | 29.8 | 6.0 | 10.7 | 47 |

*Content in the copolymer
Unit of feed amount and content is mol %.

Examples 1–3 are continuous feed examples, whereas Examples 4–6 are batch reactions. In the continuous feed examples, the norbornene monomer, i.e., monomer A, is present in a reaction vessel in an amount, preferably from 30–60 mol %, while the acrylate monomers, i.e., monomer B, is present in a feed vessel in an amount, preferably from 40–70 mol %. In accordance with Examples 1–3, a portion of monomer B is supplied to the reaction vessel containing monomer A and copolymerization is carried out during each addition. Note that during any of the additions, monomer A is present in a stoichiometric excess as compared to monomer B since essentially all of the added portion of monomer B is copolymerized prior to the addition of another quantity of monomer B. The results shown in Table 1 illustrate that Examples 1–3 provide superior results as compared to Examples 4–6.

Examples 7–11 illustrate the principle of controlled incorporation of cyclic olefins in free-radical acrylic copolymerizations. These examples also illustrate the utility of conducting polymerizations when cyclic olefin concentrations are greater than acrylic concentrations (most preferably by at least a 2:1 ratio, since limiting values for cyclic olefin

Having thus described our invention in detail, what we claim as new and desire to secure by the letters patent is:

1. A method of producing a copolymer comprising the step of:

reacting at least one monomer A which is an unsaturated alicyclic monomer and forms a polymer main chain by dissociation of an unsaturated bond, and at least one unsaturated monomer B, which also forms a polymer chain by dissociation of an unsaturated bond, wherein less than two electron-withdrawing groups are directly appended to said unsaturation, and where said monomer B is other than the unsaturated alicyclic monomer and forms a polymer main chain, in the presence of a free radical initiator, wherein said reacting is carried out using a stoichiometric excess of monomer A as compared to monomer B.

2. The method of claim 1 wherein said monomer A is a cyclic olefin having one of the following formulas:

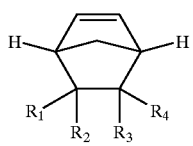

A1

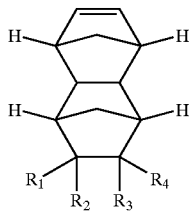

A2 wherein $R_1$, $R_2$, $R_3$ and $R_4$, independently of each other, may be selected from the group consisting of hydrogen, hydrocarbons, halogens, halogenated carbons or hydrocarbons, and functionalized hydrocarbons of the form R* or J-R* where J is a divalent spacer group and R* is a polar group having one or more heteroatoms with a Pauling electronegativity greater than 3.0, or $R_1$ and $R_2$, $R_3$ and $R_4$, $R_1$ and $R_4$, or $R_2$ and $R_3$, taken together, can be a five- or six-membered cyclic hydrocarbon ring that optionally contains an R* group within the ring or pendant thereto.

3. The method of claim 1 wherein said monomer B has one of the following formulas:

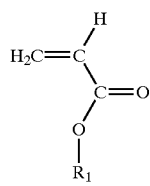

B1

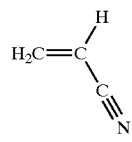

B2

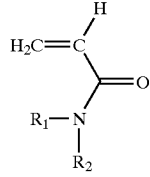

B3

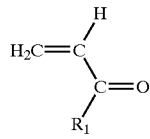

B4 wherein $R_1$ and $R_2$ independently of each other, may be selected from the group consisting of hydrogen, hydrocarbons, halogens, halogenated carbons or hydrocarbons, and functionalized hydrocarbons of the form R* or J-R* where J is a divalent spacer group and R* is a polar group having one or more heteroatoms with a Pauling electronegativity greater than 3.0.

4. The method of claim 3 wherein said monomer B is a monomer of formula B 1or B2.

5. The method of claim 1 wherein said reacting is performed using twice as much monomer A as monomer B.

6. The method of claim 1 wherein the resulting copolymer comprises, in terms of molar fraction, from about 25 to about 35% of monomer A and from about 65 to about 75% of monomer B.

7. The method of claim 1 further comprising adding additional monomer B after the copolymer has begun to form.

8. The method of claim 7 wherein said adding includes continuously adding monomer B to monomer A.

9. The method of claim 1 wherein said reacting occurs in the absence of any significant amount of a Lewis acid promoter of co-ordination catalyst.

10. The method of claim 1 wherein said free radical initiator is an azo compound or an organic peroxide compound.

11. The method of claim 1 wherein said reacting is performed at a temperature of from about 50° C. to about 150° C.

12. The method of claim 1 wherein said reacting is performed in the presence of an organic solvent.

13. The method of claim 1 wherein said organic solvent is used in a concentration of from about 10 to about 60 wt. %.

14. The method of claim 1 further comprising adding another monomer which is different from either monomer A or monomer B to the reacting step.

15. The method of claim 1 wherein said free radical initiator is used in an amount sufficient to effect a free radical polymerization to occur between at least monomer A and monomer B.

16. The method of claim 1 wherein said monomer A has the formula:

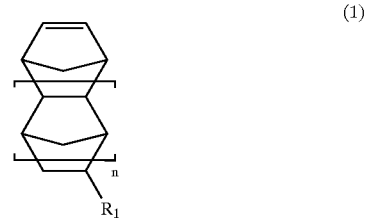

(1)

and said monomer B has the following formula

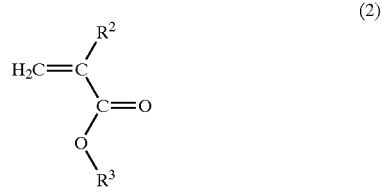

(2)

wherein $R^1$ represents a monovalent organic group, $R^2$ represents hydrogen, $R^3$ represents a monovalent organic group and n is an integer from 0 to 2.

17. A method for producing a copolymer comprising reacting monomer A and monomer B in the presence of a free radical initiator under conditions in which monomer A has a greater molar concentration than monomer B, wherein said monomer A has at least one of the following formulas:

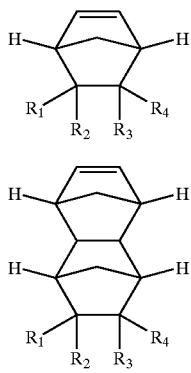

A1

A2 wherein $R_1$, $R_2$, $R_3$ and $R_4$, independently of each other, may be selected from the group consisting of hydrogen, hydrocarbons, halogens, halogenated carbons or hydrocarbons, and functionalized hydrocarbons of the form R* or J-R* where J is a divalent spacer group and R* is a polar group having one or more heteroatoms with a Pauling electronegativity greater than 3.0, or $R_1$ and $R_2$, $R_3$ and $R_4$, $R_1$ and $R_4$, or $R_2$ and $R_3$, taken together, can be a five- or six-membered cyclic hydrocarbon ring that optionally contains an R* group within the ring or pendant thereto; and said monomer B has one of the following formulas:

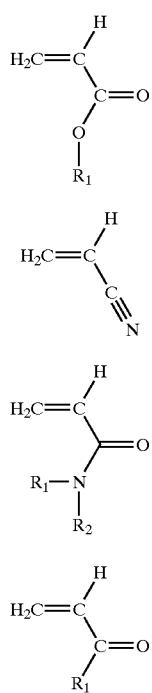

B1

B2

B3

B4 wherein $R_1$ and $R_2$ independently of each other, may be selected from the group, consisting of hydrogen, hydrocarbons, halogens, halogenated carbons or hydrocarbons, and functionalized hydrocarbons of the form R* or J-R* where J is a divalent spacer group and R* is a polar group having one or more heteroatoms with a Pauling electronegativity greater than 3.0.

18. A method for producing a copolymer comprising the step of:

copolymerizing at least one monomer A which is an unsaturated alicyclic compound and forms a polymer main chain by dissociation of the unsaturated bond, and at least one unsaturated monomer B other than the unsaturated alicyclic compound and forms the polymer main chain, wherein the copolymerization step comprises a step of preparing an organic solvent containing either the monomer A or monomer B, and a step of copolymerizing the monomers by successively adding an organic solvent containing the other monomer to the organic solvent containing the above monomer, said copolymerization being carried out in a stoichiometric excess of monomer A as compared to monomer B.

19. The method of claim 18 wherein the monomer A and the monomer B are respectively shown by the following formulas (1) and (2):

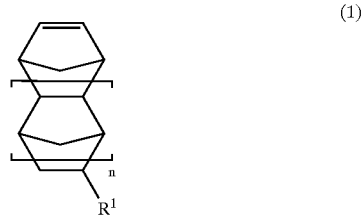

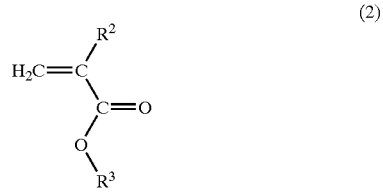

wherein $R^1$ represents a monovalent organic group, $R_2$ represents a hydrogen atom, and $R^3$ represents a monovalent organic group, and n is an integer from 0 to 2.

20. The method of claim 18 wherein said adding includes continuously adding monomer B to monomer A.

21. The method of claim 20 wherein monomer A is present, in a reaction vessel in which copolmerization occurs, in an amount from 30–60 mol % and monomer B is present, in a feed vessel, in an amount from 40–70 mol %, said feed vessel supplying monomer B to the reaction vessel during copolymerization.

* * * * *